(12) United States Patent
Ulwick

(10) Patent No.: US 7,340,409 B1
(45) Date of Patent: *Mar. 4, 2008

(54) COMPUTER BASED PROCESS FOR STRATEGY EVALUATION AND OPTIMIZATION BASED ON CUSTOMER DESIRED OUTCOMES AND PREDICTIVE METRICS

(76) Inventor: Anthony W. Ulwick, 106 N. Lake Drive, Lantana, FL (US) 33462

( * ) Notice: Subject to any disclaimer, the term of this patent is extended or adjusted under 35 U.S.C. 154(b) by 1250 days.

This patent is subject to a terminal disclaimer.

(21) Appl. No.: 09/652,576

(22) Filed: Aug. 31, 2000

Related U.S. Application Data

(63) Continuation of application No. 09/385,661, filed on Aug. 27, 1999, now Pat. No. 6,115,691, which is a continuation of application No. 08/716,948, filed on Sep. 20, 1996, now Pat. No. 5,963,910.

(51) Int. Cl.
G06Q 40/00 (2006.01)
(52) U.S. Cl. ...................................................... 705/10
(58) Field of Classification Search ............... 705/7–10
See application file for complete search history.

(56) References Cited

U.S. PATENT DOCUMENTS

| | | | | |
|---|---|---|---|---|
| 4,885,685 A | * | 12/1989 | Wolfberg et al. | 705/14 |
| 4,894,773 A | * | 1/1990 | Lagarias | 705/7 |
| 4,924,386 A | * | 5/1990 | Freedman et al. | 705/8 |
| 4,996,642 A | * | 2/1991 | Hey | 705/27 |
| 5,041,972 A | * | 8/1991 | Frost | 705/10 |
| 5,111,392 A | * | 5/1992 | Malin | 705/29 |
| 5,124,911 A | * | 6/1992 | Sack | 705/10 |
| 5,200,909 A | * | 4/1993 | Juergens | 702/25 |
| 5,299,115 A | * | 3/1994 | Fields et al. | 705/10 |
| 5,416,694 A | * | 5/1995 | Parrish et al. | 705/8 |
| 5,432,904 A | * | 7/1995 | Wong | 705/4 |
| 5,734,890 A | * | 3/1998 | Case et al. | 707/5 |

OTHER PUBLICATIONS

Gartner Group Executive Services "Exective Market Analysis Program" EMAP pp. 11-36).*

* cited by examiner

Primary Examiner—Hani M. Kazimi
(74) Attorney, Agent, or Firm—Malin, Haley & DiMaggio, P.A.

(57) ABSTRACT

A computer program product for use with a computer system for providing a process for strategy evaluation and optimization, having a computer-readable medium of instructions for directing a computer to evaluate data for optimizing strategic options. The product includes data storage relating to specific desired outcomes relating to a specific process for an identified customer set and data relating to metrics which predict the satisfaction of desired outcomes. The process has a computer program for quantifying the degree to which each metric predicts satisfaction of each customer desired outcome. Users define strategic options; each option is designed to satisfy customer desired outcomes. A computer program quantifies the degree to which each strategic option satisfies customer desired outcomes. A plurality of strategic options is evaluated.

10 Claims, 20 Drawing Sheets

GETTING STARTED

Using a scale of 1-10, where 10 is critically important and 1 is not important at all, how important is it to you that...

| | 1 -Importance Rating- 10 |
|---|---|
| End Users are satisfied by the final solution | 8 |
| Decision Makers are satisfied by the final solution | 4 |
| Stakeholders are satisfied by the final solution | 4 |
| Manufacturing Personnel are satisfied by the final solution | 4 |

☒ Use Default Values

[Help] [Print] [Cancel] [Done]

FIG. 3

POSSITION ANALYSIS

End Users

Mission: Create/Evaluate Complete Two-Way Portable Radio Concepts

Select Your Target Segment

ALL DATA

Market research indicates that End Users want the device to ...

Maintain a charge for a full day of activity

Segment Importance Rating
Segment Satisfaction Rating
☐ Use Default Values

How satisfied do you want End Users to be that this device will ...

Maintain a charge for a full day of activity 1
1 Target Satisfaction 10

[Help] [Print] [Cancel] [Done]

FIG. 4

| | WHATS IMPORTANT? - SORTED REQUIREMENTS | |
|---|---|---|
| | The list below consists of all of the requirements. They are listed in order of importance of consideration. | |
| 1 | Minimize device downtime | 1.61 |
| 2 | Enable communications from difficult transmission areas | 1.52 |
| 3 | Prevent its unauthorized use | 1.38 |
| 4 | Continue to operate in the event of a system power | 1.36 |
| 5 | Maintain a charge for a full day of activity | 1.36 |
| 6 | Allow the transmission of an emergency signal under | 1.35 |
| 7 | Ensure the transmission are secure from unauthorized | 1.35 |
| 8 | Withstand the abuse of everyday use | 1.32 |

FIG. 5

| | PRIORITIZED PREDICTIVE METRICS | |
|---|---|---|
| 1 | Increase percent of time the device can access the desired receiver (difficult trans) | 2.00 |
| 2 | Reduce number of receptions that can be understood by unintended recipients | 1.75 |
| 3 | Reduce cost of accessories | 1.56 |
| 4 | Reduce number of features that can be customized | 1.43 |
| 5 | Reduce cost of replacement batteries | 1.43 |
| 6 | Reduce time/steps/force to trigger an emergency request | 1.40 |

FIG. 6

METRIC DESCRIPTION

Predictive Metric

| Increase percent of time the device can access the desired receiver (difficult) |

Metric Description

[Print]  [Done]

FIG. 7

DEFINING YOUR OPTIONS

| # | Option |
|---|---|
| 1 | Current Situation, No Changes |
| 2 | Option 1 |
| 3 | Option 2 |
| 4 | |
| 5 | |
| 6 | |
| 7 | |
| 8 | |
| 9 | |
| 10 | |
| 11 | |
| 12 | |

This option assumes you will make no changes in your current situation. If you set this option as your baseline option in the next screen, you can compare the alternative options to what you already have.

[Help]  [Print]  [Cancel]  [Done]

FIG. 8

| | SETTING THE BASELINE FOR COMPARISON | ▽ △ |
|---|---|---|

A basis for comparison is required. Identify the option against which all others will be compared. You should select the option you expect will best satisfy your requirements. Upon completion you will be ready to evaluate your options.

| Current Situation, No Changes | ◆ |
|---|---|

What percent of the Predictive Metrics do you want to use to evaluate your Options? | 50 ◆ |

| Help | | Cancel | | Evaluate |

FIG. 9

| | EVALUATION OF OPTIONS | ▽ △ |
|---|---|---|

Option Under Evaluation

| Option 1 | ◆ |
|---|---|

Baseline Option

| Current Situation, No Changes |
|---|

Is the option under evaluation better, worse or the same as the baseline option at ensuring you...

| | | |
|---|---|---|
| 1 | Increase percent of time the device can access the desired receiver (difficult trans) | Better Than Baseline |
| 2 | Reduce number of receptions that can be understood by unintended recipients | Worse Than Baseline |
| 3 | Reduce cost of accessories | |
| 4 | Reduce number of features that can be customized | Better Than Baseline |

| Help | Print | Done |

FIG. 10

RESULTS OF EVALUATION

Evaluation Saved As: Default Evaluation Set

Baseline Option: Current Situation, No Changes

| 1 | Option 1 | 5.48 |
|---|----------|------|
| 2 | Option 2 | 0.00 |

[New Baseline]    [Refine Options]

[Help]    [Print]    [Done]

FIG. 11

IMPROVE YOUR OPTIONS

Evaluation Name: Default Evaluation Set

Option

Option 1      5.48 Rating

This option does not do well at ensuring you

Reduce number of receptions that can be understood by unintended recipients

Why did this other option score better?

No Option Did Better Than The Baseline Option

How could you improve this option?

New Option Name

[Save New Option]

[Help]    [Print Analysis]    [Done]

FIG. 12

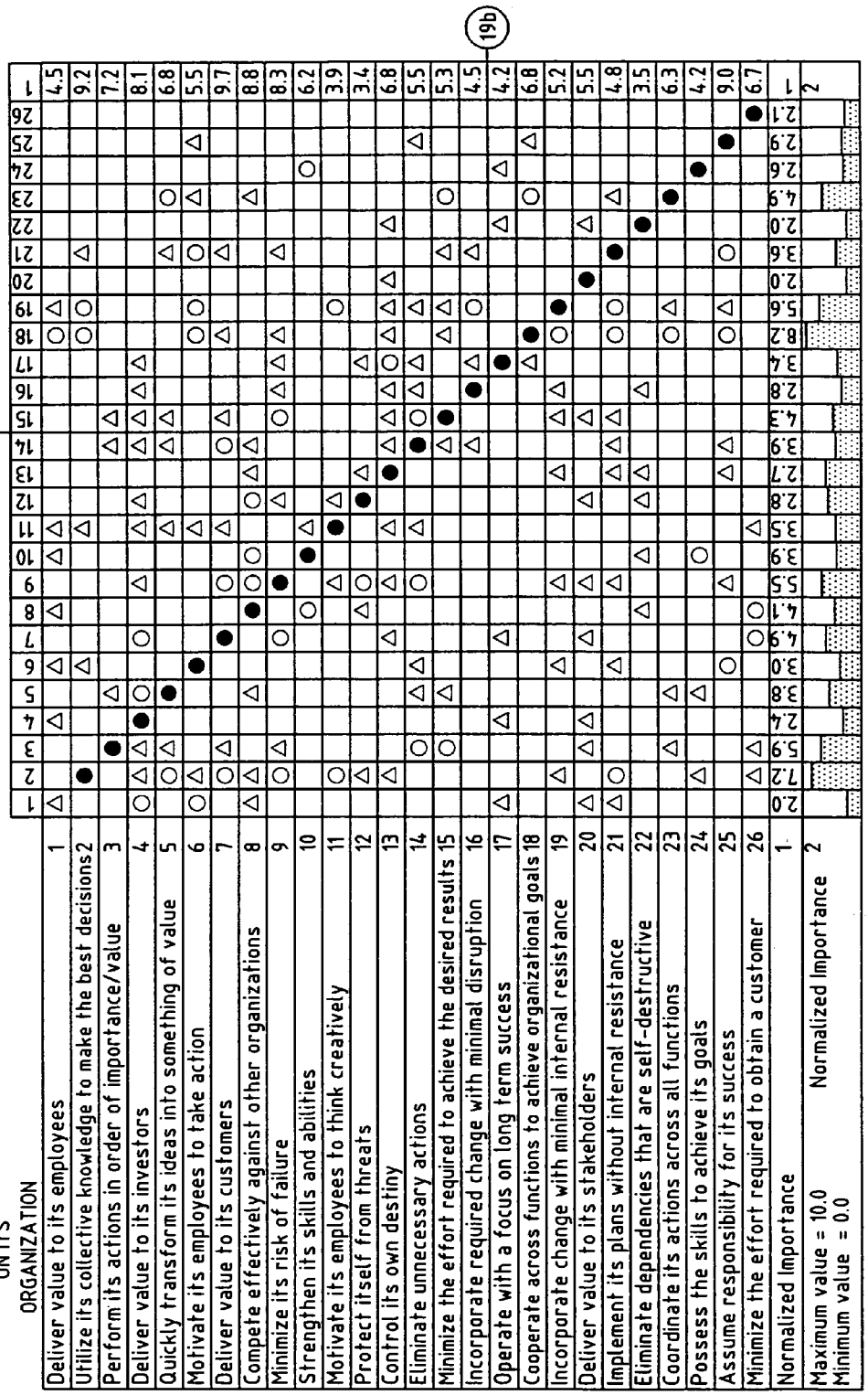

FIG. 20b

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | |
|---|---|---|---|---|---|---|---|---|---|---|---|---|---|---|---|---|---|---|---|---|---|---|---|---|---|---|---|
| 2 | 6.3 | 2.3 | 8.8 | 4.2 | 5.1 | 7.2 | 3.6 | 5.1 | 7.3 | 3.5 | 3.5 | 5.4 | 4.7 | 8.5 | 4.2 | 6.1 | 4.1 | 4.2 | 3.9 | 6.2 | 4.5 | 3.5 | 5.3 | 4.2 | 7.4 | 5.3 | 2 |
| 3 | | | | | | | | | | | | | | | | | | | | | | | | | | | 3 |
| 4 | 6.1 | 5.8 | 5.6 | 5.5 | 5.2 | 5.1 | 4.5 | 4.3 | 4.3 | 4.3 | 4.2 | 3.9 | 3.9 | 3.4 | 3.4 | 3.4 | 3.3 | 3.3 | 3.0 | 2.8 | 2.8 | 2.6 | 2.6 | 2.4 | 2.2 | 2.1 | 4 |

FIG. 20a

| | |
|---|---|
| 1 | Number of decisions made through organizational consensus <-- |
| 2 | Number of knowledgeable employees involved in decision making <-- |
| 3 | Percent of required actions prioritized for synergistic value <-- |
| 4 | Percent of employees that are involved in decisions affecting themselves <-- |
| 5 | Number of decisions that consider all the facts <-- |
| 6 | Percent of actions coordinated across all functions <-- |
| 7 | Number of opportunities for customers to achieve their desired outcomes <-- |
| 8 | Number of actions taken that will not predict success --> |
| 9 | Number of actions accomplished to establish a strength <-- |
| 10 | Number of actions that cannot be traced to the delivery of value --> |
| 11 | Number of actions taken to grow a skill <-- |
| 12 | Time it takes to turn ideas into something of value --> |
| 13 | Percent of employees that are committed to plans affecting themselves <-- |
| 14 | Number of opportunities for creative thinking <-- |
| 15 | Percent of long-term outcomes considered in decision making <-- |
| 16 | Percent of positive actions that are rewarded <-- |
| 17 | Number of failures linked to inadequate actions --> |
| 18 | Number of defenses from threats/danger <-- |
| 19 | Number of plans that are out of phase with long term plans --> |
| 20 | Number of actions that are externally motivated --> |
| 21 | Percent of skills acquired to achieve the desired results <-- |
| 22 | Number of opportunities for investors to achieve their desired outcomes <-- |
| 23 | Number of known characteristics of the target customer <-- |
| 24 | Number of opportunities for stakeholders to achieve their desired outcomes <-- |
| 25 | Number of opportunities for employees to achieve desired outcomes <-- |
| 26 | Number of self-destructive dependencies <-- |
| 1 | Importance (Top 2 Box) |
| 2 | Satisfaction With Current Approach (Top 2 Box) |
| 3 | Maximum value = 12.0     Percent Importance |
| 4 | Minimum value = -1.0     Percent Importance |

Evaluation Of Business Concepts

CONCEPT SELECTION AND EVALUATION ANALYSIS

| # | Concept | 1 | 2 | 3 | 4 | 5 | 6 | 7 | Score |
|---|---|---|---|---|---|---|---|---|---|
| 1 | Percent of decisions made through organizational consensus | + | S | + | + | + |   | + | 8.2 |
| 2 | Percent of knowledgable employees involved in decision making | + | S | + | + | + |   | + | 7.2 |
| 3 | Percent of required actions prioritized for synegistic value | S | + | S | + | + |   | + | 5.9 |
| 4 | Percent of employees that are involved in decisions affecting themselves | + | S | + | + | + |   | + | 5.6 |
| 5 | Percent of decisions that consider all the facts | S | S | S | + | + |   | + | 5.5 |
| 6 | Percent of actions coordinated across all funtions | S | + | + | + | + |   | + | 4.9 |
| 7 | Percent of uncovered opportunities for customers to achieve their DO's | S | S | S | + | + |   | + | 4.9 |
| 8 | Percent of actions taken that will not predict success | S | + | + | + | + |   | + | 4.3 |
| 9 | Percent of actions taken to establish a strength | + | + | + | + | + |   | + | 4.1 |
| 10 | Percent of actions that cannot be traced to the delivery of value | + | + | + | + | + |   | + | 3.9 |
| 11 | Percent of actions taken to grow a skill | S | + | + | + | + |   | + | 3.9 |
| 12 | Time it takes to turn ideas into something of value | S | + | + | + | + |   | + | 3.8 |
| 13 | Percent of employees that are committed to plans affecting themselves | S | S | + | + | + |   | + | 3.6 |
| 14 | Number of opportunities for creative thinking | S | S | S | + | S |   | S | 3.5 |
| 15 | Percent of long-term outcomes considered in decision making | S | S | S | + | S |   | + | 3.4 |
| 16 | Percent of positive actions that are rewarded | S | S | S | + | S |   | S | 3.0 |
| 17 | Number of failures linked to inadequate actions | S | S | S | + | S |   | S | 2.9 |
| 18 | Number of defenses from threats/danger | S | S | + | + | S |   | + | 2.8 |
| 19 | Percent of plans that are out of phase with long term plans | S | S | S | + | S |   | + | 2.8 |
| 20 | Percent of actions that are externally motivated | S | S | S | + | S |   | S | 2.7 |
| 21 | Percent of skills acquired to achieve the desired results | + | S | + | + | + |   | + | 2.6 |
| 22 | Number of opportunities for investors to achieve their desired outcomes | + | S | + | + | + |   | + | 2.4 |
| 23 | Percent of known characteristics of the target customer | + | − | S | + | + |   | + | 2.1 |
| 24 | Number of opportunities for stakeholders to achieve their desired outcomes | S | − | S | + | + |   | S | 2.0 |
| 25 | Number of opportunities for employees to achieve desired outcomes | S | S | + | + | + |   | + | 2.0 |
| 26 | Number of self-destructive dependencies | S | S | S | + | + |   | + | 2.0 |
| 1 | Total Advantages | 33.6 | 29.1 | 43.3 | 91.6 | 89.6 |   | 91.6 |   |
| 2 | Total Disadvantages |   | 4.0 |   |   |   |   |   |   |
| 3 | Total Score | 33.6 | 29.1 | 43.3 | 91.6 | 89.6 |   | 91.6 |   |

FIG. 22a

| 1 | Normalized Importance |
|---|---|
| 2 | Maximum value = 10.0<br><br>Normalized Importance<br><br>Minimum value = 0.0 |
| 3 | Current Value of Most Organizations |
| 4 | Target Value 1996 |
| 5 | Target Value 1997 |
| 6 | Target Value 1999 |

FIG. 23b

| 1 | QFD, 4 Phase vs. Typical Approach |
|---|---|
| 2 | Process Reengineering vs. Typical Approach |
| 3 | Teams vs. Typical Non-Team Approach |
| 4 | Invention vs. Typical Approach |
| 5 | Invention vs. QFD |
| 6 |  |
| 7 | Ideal Theoretical Approach |
| 1 | Normalized Importance |
| 2 | Maximum value = 10.0    Normalized Importance<br><br><br><br>Minimum value = 1.0 |

FIG. 22b

Target Values For Prioritized Metrics
MANAGEMENT'S REQUIREMENTS ON ITS ORGANIZATION

| | | 1 | 2 | 3 | 4 | 5 | 6 |
|---|---|---|---|---|---|---|---|
| -> | Percent of decisions made through organizational consensus | 1 | 8.2 | | 5% | 95% | 98% | 99% |
| -> | Percent of knowledgable employees involved in decision making | 2 | 7.2 | | 15% | 60% | 95% | 95% |
| -> | Percent of required actions prioritized for synegistic value | 3 | 5.9 | | 5% | 75% | 90% | 95% |
| -> | Percent of employees that are involved in decisions affecting themselves | 4 | 5.6 | | 15% | 60% | 95% | 95% |
| -> | Percent of decisions that consider all the facts | 5 | 5.5 | | 5% | 95% | 98% | 99% |
| -> | Percent of actions coordinated across all funtions | 6 | 4.9 | | 50% | 90% | 95% | 98% |
| -> | Percent of uncovered opportunities for customers to achieve their DO's | 7 | 4.9 | | 25% | 85% | 95% | 98% |
| <- | Percent of actions taken that will not predict success | 8 | 4.3 | | 50% | 10% | 5% | 2% |
| -> | Percent of actions taken to establish a strength | 9 | 4.1 | | 25% | 50% | 75% | 95% |
| <- | Percent of actions that cannot be traced to the delivery of value | 10 | 3.9 | | 50% | 10% | 5% | 2% |
| -> | Percent of actions taken to grow a skill | 11 | 3.9 | | | | | |
| <- | Time it takes to turn ideas into something of value | 12 | 3.8 | | | | | |
| -> | Percent of employees that are committed to plans affecting themselves | 13 | 3.6 | | | | | |
| -> | Number of opportunities for creative thinking | 14 | 3.5 | | | | | |
| -> | Percent of long-term outcomes considered in decision making | 15 | 3.4 | | | | | |
| -> | Percent of positive actions that are rewarded | 16 | 3.0 | | | | | |
| -> | Number of failures linked to inadequate actions | 17 | 2.9 | | | | | |
| -> | Number of defenses from threats/danger | 18 | 2.8 | | | | | |
| <- | Percent of plans that are out of phase with long term plans | 19 | 2.8 | | | | | |
| -> | Percent of actions that are externally motivated | 20 | 2.7 | | | | | |
| -> | Percent of skills acquired to achieve the desired results | 21 | 2.6 | | | | | |
| -> | Number of opportunities for investors to achieve their desired outcomes | 22 | 2.4 | | | | | |
| -> | Percent of known characteristics of the target customer | 23 | 2.1 | | | | | |
| -> | Number of opportunities for stakeholders to achieve their desired outcomes | 24 | 2.0 | | | | | |
| -> | Number of opportunities for employees to achieve desired outcomes | 25 | 2.0 | | | | | |
| <- | Number of self-destructive dependencies | 26 | 2.0 | | | | | |

The Top 10 Metrics Synergistically satisfy 55% Of The Requirements

FIG. 23a

COMPUTER BASED PROCESS FOR STRATEGY EVALUATION AND OPTIMIZATION BASED ON CUSTOMER DESIRED OUTCOMES AND PREDICTIVE METRICS

This application is a continuation of U.S. patent application Ser. No. 09/385,661, filed Aug. 27, 1999 now U.S. Pat. No. 6,115,691, which is a continuation of U.S. patent application Ser. No. 08/716,948, filed Sep. 20, 1996, now U.S. Pat. No. 5,963,910.

BACKGROUND OF THE INVENTION

1. Field of the Invention

The present invention relates generally to computer based data management systems, and more particularly, to a computer based data integration and management processing system and method for evaluating and optimizing personal and business strategies.

The invention described herein discloses technology that enables individuals and businesses to evolve their decision making capabilities far beyond their current capacity. The present invention expands an individual's capacity to process and apply thousands of pertinent facts when making complex personal and business decisions. The present invention comprises a user-friendly computer program product that enables a user to analyze complex situations, objectively evaluate alternative solutions, and create and optimize personal or business strategies. The software is processor operated on a compatible computer system.

The computer program product of the instant invention allows the user to choose from a variety of missions. A mission is a particular task, project, or decision which an individual, employee, or business is contemplating. Upon selection of a specific mission, the data, including statements that define the criteria for creating value are retrieved from a database along with other pertinent facts that are critical to objective decision making. The user is then led through a process that enables the development of solutions and strategies that deliver many times more value than could normally be achieved.

The computer program product of the present invention is designed as two separate modules; one for data input and the other as a fixed application shell. By loading mission specific data into the input module, the application shell can instantly become a different software product for different users, markets, or industries. This flexibility enables new software products to be developed quickly and at minimal expense. The data that is manipulated by the software invention is compiled and comprises the collection, prioritization, analysis, and structuring of thousands of facts related to those individuals involved in, or affected by, the mission that is being contemplated. These "customers" may be an end user of a product, a manufacturer, a manager, or one's self when making personal decisions, to name a few. The facts are collected in advance and structured for each specific mission, loaded into the computer, or processor means, stored in predetermined memory locations, and processed by the software. The memory locations comprise a plurality of identifiable data storage array locations that are indexed by the processor and the software of the invention to pull requested or required data to assist the user in evaluating and optimizing their decisions for an unlimited number of missions. Accordingly, the applications of this invention are numerous. For example, by integrating mission specific data into the fixed application shell, the computer program product of the present invention can be adapted to: (1) provide individuals with the ability to create, evaluate, and optimize many personal strategies including career, education, relocation, relationship, philosophy of life and personal growth strategies; (2) provide organizations of all sizes with the ability to evolve generic, time-to-market processes such as product development, manufacturing, and other value-added processes such as planning, distribution, training and support; and (3) provide individuals and organizations of all sizes with the ability to create, evaluate, and optimize their proprietary strategies, such as energy generation and storage technologies, innovative thinking, two-way communications, new business evaluation, ergonomics and others.

2. Description of the Prior Art

When making complex personal and business decisions, individuals attempt to find the one solution that will enable them to optimally achieve their desired outcomes. This process is often referred to as a decision making, planning or strategic planning process. The resulting solution, or plan of action, is often referred to as a strategy. For purposes of this disclosure, strategy shall be defined as the means by which a business or individual achieves a set of desired outcomes.

A set of desired outcomes includes all the outcomes that are desired by those involved in, or affected by, a potential decision, plan or strategy. A complete set usually includes up to 150 unique outcomes. Each desired outcome is defined in a statement that includes what is desired, why it is desired and what must be done to insure the outcome is achieved. A desired outcome is a unique statement in that it is free from solutions and specifications, free from vague words, and the statement itself is valid and stable over time. Desired outcomes, however, are difficult to capture as people tend to talk about solutions. Solutions are the mechanism by which desired outcomes are achieved. A "good" solution will satisfy several preferred desired outcomes. As an example, a product developers desired outcomes may include reducing the time to complete the product development cycle and insuring all design modifications are documented. One solution could be to invest in a CAD-CAM system, but other solutions are available.

When creating a plan or strategy there often exist dozens, or even hundreds, of potential solutions. The goal in developing a plan or strategy is to find the single solution that satisfies most of the desired outcomes. The optimal solution will also be the one that can be executed with the least amount of effort, cost, and risk.

To find or create the optimal solution for a given strategic situation, an individual must have the capability to know, remember, process and apply thousands of pertinent facts. Individuals and businesses can evolve their decision making capabilities far beyond their current capacity by applying the invention described herein.

Many individuals and businesses currently involved in decision making, planning and strategic planning activities are faced with unavoidable obstacles to successful decision making. These obstacles to success can be summarized as follows:

1. Individuals and businesses are often unaware of all the people or entities that must be considered to successfully create and execute a personal or business strategy. Important individuals, groups of individuals, or customers are sometimes overlooked, or under estimated, in the planning process. This oversight can cause the rejection or failure of a strategy;

2. Individuals and business are rarely aware of all the desired outcomes (typically totaling up to 150) that should be considered when making strategic decisions. In most cases less than 15 percent of the desired outcomes are known and many desired outcomes are poorly defined. It then follows that in most situations, the selected strategy could, at best, satisfy only up to 15 percent of the desired outcomes;

3. Areas of opportunity cannot be accurately determined without knowing which desired outcomes are most important and least satisfied. An inability to capture desired outcomes is one obstacle that makes the discovery of opportunity difficult. Without this information, individuals and businesses are unlikely to know where to focus their effort for maximum value creation. They may, therefore, apply their resources to activities that will produce little or no value;

4. Individuals and businesses are usually unaware of the impact that satisfying one desired outcome would have on the satisfaction of other desired outcomes. Implementing a solution to satisfy one desired outcome could negatively impact one or several other more important desired outcomes. Conversely, a solution that may satisfy one desired outcome could positively impact several other important desired outcomes. Unless all the desired outcomes and their inter-relationships are known, an individual's ability to discover or create the optimal solution is inhibited;

5. Individuals and businesses usually evaluate only a handful of potential solutions. It is often the case that dozens or even hundreds of other potential solutions exist, but they are never evaluated. It usually takes too much time to uncover and evaluate all possible solutions. The optimal solution is often left undiscovered.

6. Individuals often try to determine, in their head, which of the proposed solutions would best satisfy all the desired outcomes. There are limitations to a human mind, and it is apparent that it would be near impossible for an individual to accurately define the optimal solution given that there are potentially hundreds of solutions and up to 150 desired outcomes for any given strategic situation. There are just too many constants and variables.

For example, to solve a simultaneous equation in algebra, such as $y=3$ and $y=x+1$, there are two variables given, x and y. Most people cannot solve this relatively simple equation in their head. In most strategic situations, however, there are often over a hundred solutions (variables) and up to 150 desired outcomes (constants) that must be considered in order to effectively solve the equation. Thus, the probability of an individual optimally solving this complex equation in their head is near zero. Despite this fact, businesses and individuals often rely on their internal decision making abilities to determine which solution will best solve a complex strategic equation;

7. Individual and business strategies are often decided on gut feel, intuition, opinion, experience, emotion, history, or some other subjective criteria. Moreover, individuals in an organization often use different criteria to evaluate the same alternative solutions. The solutions are often discussed, argued, negotiated, and eventually compromised to the point where commitment is lacking and implementation is slow. Using subjective or inappropriate criteria to evaluate alternative solutions often produces unpredictable and less than desirable results;

8. Individuals and businesses often lack the ability to quantify the value that one proposed solution has over another. Since the evaluation criteria is often undefined, not agreed to, or unprioritized, it is difficult to ascertain the amount of value that one solution has over another. This lack of information makes it difficult to reach a conclusion or gain consensus on any solution;

9. Individuals and businesses often stop short of defining the optimal solution because they are unaware of the criteria that defines the optimal solution. Without having access to that criteria, an individual is likely to focus on areas of the mission that they find easy to address or personally interesting. Using this approach often misdirects the application of scarce resources and may not produce the desired result;

10. Individuals and businesses will often prototype, develop, or implement a solution to assess its potential value. Prototyping a solution often requires spending thousands or millions of dollars in advance of knowing whether or not the solution will be successful. Implementing a solution to test its value may drive a de facto strategy that could be difficult to change. If the potential value of a solution could be determined in advance of its development, much time and money could be saved; and 11. Individuals and businesses will often focus on specific parts or elements of a mission rather than focusing on optimizing all the elements within a given mission. Thus, one specific area is improved while negatively impacting other areas. The overall effect may be undesirable.

It should also be noted that individuals and organizations often choose strategies that have worked for someone else. This approach is seldom successful as it ignores the desired outcomes that make that specific situation unique. The optimal strategy for a specific strategic situation is rarely a generic strategy as it is unlikely that the individuals involved, and their desired outcomes, are the same in any two strategic situations.

As the limitation of the human mind is well recognized, there is found in the prior art a number of methods and systems for designing, planning, manufacturing and evaluating the development of goods and services. However, none of these addresses nor solves the problems noted above.

For example, U.S. Pat. No. 5,041,972 issued to Frost and entitled "Method of Measuring and Evaluating Consumer Response for the Development of Consumer Products", discloses a method for evaluating consumer response and relates to methods for performing market research which involve measuring and evaluating the responses of consumers or of the relevant audience to consumer products which are to be marketed or presented to the audience, the members of which are in a position to choose between the items. The object of such methods is to determine how members of the audience will react to the introduction of new products to the market or to changes in the characteristics of an existing product. Marketing strategies can then be based upon the data obtained therefrom.

U.S. Pat. No. 5,111,392 issued to Malin and entitled "Design System for Creating Furniture Layouts" discloses a process for designing an arrangement of furniture pieces from a predetermined system of furniture. Malin essentially teaches an automated approach to speed up the creation of implementable office furniture layouts.

U.S. Pat. No. 5,297,054 issued to Kienzel et al., discloses an expert system for automatically generating gear designs. Kienzel et al., teach an automotive generated gear design process which designs parallel axis gear sets to meet constraints and performance goals. The process generates multiple designs by choosing a design approach based on performance goals and using the approach to determine which standard gear and gear set design equations to apply to generic gear and gear set models. The process then chooses the "best" design to meet performance criteria and design constraints. A gear designer supplies design goals and constraints. Based on the gear designer's choice of input and design approach, an equation sequencer applies standard gear design equations to generic gear set models by combining hundreds of equations to calculate gear parameters. The goals, constraints, design approach, and sequenced equations are distilled into an automatically generated program used to generate, sort and evaluate designs. As a result, hundreds of designs can be sorted and compared both graphically and numerically.

U.S. Pat. No. 5,416,694, issued to Parrish et al., teaches a computer based data integration and management process for work force planning and occupational free adjustment. Parrish teaches a system and method using a number of databases that are either created internally or are imported from existing databases. These databases are manipulated by the invention or skill matching analysis based on a rigorous behavioral skill analysis of target occupations, using one or more predetermined analysis metrics and an examination of individual skills using metrics with similar behavioral attributes.

A theory of product quality enhancement utilizing matrix analysis is loosely referred to as Quality Function Deployment (QFD). However, the prior art has not refined QFD theory into a workable system for widespread use in strategic planning and evaluation. As a result, the application of QFD is limited and has not gained wide commercial acceptance as a tool for strategic evaluation.

None of the foregoing references provide a readily adaptable computer based data integration and management processing system and method for evaluating and optimizing personal and business strategies.

Consequently, the present invention is directed to overcoming the disadvantages and shortcomings of the prior art by providing a readily adaptable computer based data integration and management processing system and method for evaluating and optimizing personal and business strategies using matrix analysis.

SUMMARY OF THE INVENTION

In accordance with the foregoing, the instant invention provides a computer based system and software package that receives, stores, and manipulates customer related data to enable individuals and businesses to evolve and optimize their decision making ability far beyond their current capacity by taking into account substantially all relevant variables and concerns that can affect a decision.

The invention described herein provides individuals and businesses with the ability to evolve decision making far beyond current capacity by taking into account more variables than ever before and processing them more efficiently. Value can be determined or created by individuals and businesses at an accelerated rate utilizing the present invention. Consequently, this invention is defined as technology for accelerated growth.

The instant invention overcomes the disadvantages existing in the prior art methods of strategy evaluation and decision optimization by providing a computer based system and menu-driven software that processes and extracts preloaded or user loaded data in accordance with user specific inputs. The software is designed for generic use, such as spread sheets or word processing software, but is tailored for making the best decision based on objective standards. The strategy evaluation and optimization of the instant invention eliminates many inefficiencies and limitations of prior decision making methods.

The invention disclosed herein improves upon background methods addressing the following objectives:

1. For each mission that a user may select, all the individuals, groups of individuals or customers that must be considered in order to achieve that mission are identified in advance, and presented to the user. The user is given the option of weighting the importance that each individual, group, or customer plays in determining the optimal strategic solution. This feature insures that all those individuals and/or groups that are involved in, or affected by, the mission, or decision, are considered when evaluating mission specific strategies.

2. Desired outcomes for each of those individuals or groups are captured in advance using advanced market research techniques. This data is loaded and stored by the invention and presented to the user as part of the computer program product of the present invention. This information describes all the outcomes that the optimal solution would achieve. In such a format the user is able to consider up to 150, or more, unique desired outcomes for each mission. Specifically, all the desired outcomes are captured and documented, in advance, from the appropriate individuals using neurolinguistic programming ("NLP") techniques. Individuals are interviewed by researchers to obtain and document desired outcomes. The desired outcomes are captured in the necessary format for storage as computer data to enable the successful application of the invention. Upon selection of a mission, all of the associated mission specific desired outcomes are retrieved and made available to the user for weighting and consideration.

3. The relative importance and satisfaction levels of each of said desired outcomes are quantified by a large group of individuals in advance using statistically valid market research methods. This data is also presented to the user as part of the invention described herein. For example, while the qualitative aspects of gathering desired outcomes may involve between 30 and 60 individuals, the quantitative aspects may involve between 180 to 270 individuals. The number of people involved in the qualitative and quantitative aspects varies depending on the subject matter. Since the data is available for many target markets and populations, the user is given the option of selecting specific target segments of interest from a menu of options that makes the data available. Upon selection, the appropriate quantified data is retrieved and made available to the user. The present invention structures data such that areas of opportunity can easily be accessed by the user.

4. Advanced research establishes unique parameters that predict that the desired outcomes will be achieved. These parameters, called predictive metrics or predictive success factors, can be measured and controlled in the design of the solution. They predict with certainty that the desired outcomes will be achieved. One predictive metric exists for each desired outcome, however, each predictive metric may positively or negatively affect other desired outcomes. The effect of predictive metrics on each desired outcome is quantified by assigning values, or weights, to each and performing matrix analysis via the software. Accordingly, the relationship of each metric to each desired outcome is quantified in terms of the degree with the highest certainty to which each predictive metric predicts each desired outcome will be achieved, and the quantified data is stored as computerized data for presentation to the user. This format enables the user to focus on the relatively few metrics that predict the delivery of a disproportionate share of value. For example, it is often the case that 30% of the metrics predict the delivery of over 70% of the value by predicting the satisfaction of one or more certain significant desired outcomes. As a one hundred (100) point scale is preferably employed, a 100 percent return value is always desired when making a decision.

The inter-relationships of all the desired outcomes and the predictive metrics are analyzed in advance, and are presented to the user as part of the invention. This analysis is included to insure that the user is focusing on the areas that will generate the most value while optimizing critical factors such as resources, time and cost. The software of the invention facilitates roughly eight thousand (8,000) inter-relationship decisions for each specific mission. These decisions are re-evaluated and applied automatically, based on the mission, customer weighting and target segments that the user selects from the menu. The calculations depend on assigned values and computer processing using matrix analysis.

5. The user is presented with the criteria by which they may evaluate all potential solutions to achieve the desired outcomes. The criteria are in the form of the predictive metrics and are presented to the user in priority value order given the mission, customer weighting and target segment(s) that has been selected. The priority changes, automatically, as the user selects and changes the mission, customer weighting, or target segment. Since all the criteria are presented to the user as part of the invention, the user can evaluate the potential of alternative solutions in minimal time, e.g., less than twenty (20) minutes. The speed by which solutions can be evaluated enables the user to test more solutions and increases the users chances of finding the optimal solution.

6. The invention provides a disciplined method of evaluating the potential value of many possible solutions by allowing the user to simultaneously consider all the elements of the complex strategic equation. The invention systematically and intentionally separates the desired outcomes from solutions. This discipline, which is a critical element of a decision making, planning or strategic planning process, is enforced by the invention. At the appropriate time the user is guided to evaluate which desired outcomes would be improved by a specific solution. The magnitude of the improvement can also be recorded. This discipline allows the user to systematically solve a complex simultaneous equation, having many constants and variables, with minimal confusion and ambiguity.

7. As part of the invention the user is presented with objective information and software to process that information. Presenting the user with predetermined facts and values to make decisions eliminates decisions being made by subjective criteria, such as gut feel, intuition, or self-serving motivations, which can negatively impact the result. Decisions that were once made subjectively can now be made objectively and logically. It is for this reason that solutions derived using this invention can deliver many more times the value to the target customer segments than those solutions derived using traditional methods.

8. The user is presented with a means by which to quantify the potential value of each alternative solution. This quantitative value is tied to statistically valid market research which is stored in one or more databases. Potential solutions are evaluated for their ability to satisfy 100% of the desired outcomes. The score may range from −100% to +100%. It is possible that a potential solution could negatively impact 100% of the desired outcomes, in which case the solution would receive a score of −100%. The solutions can be evaluated against each other or some other baseline for comparison. The baseline can be changed by the user at any time. Hundreds of comparisons can be made. The user can use this data to reach conclusions and gain a consensus on the value that a potential solution may deliver.

9. The invention as described herein provides an interactive approach that presents the user with weaknesses and strengths that exist in any solution. The user is guided toward solutions that overcome specific weaknesses and allows them to integrate and combine the positive elements of that solution into an optimal solution. Using this iterative approach enables the user to create value producing solutions that may not have been previously considered. This focusing technology directs the user's attention and intellect to the specific parameters that must be improved in order to enhance the solution. The time the user may have wasted on solutions less likely to deliver value to the target customers is minimized and focus is maintained on important, objective, and measured parameters.

10. The invention provides the user with a process to quantify the value of each proposed solution prior to incurring any costs or taking any action and often eliminating the need to create a prototype. Since the value of a potential solution can be determined in advance of its actual development or implementation, the user saves much time, effort, and money. For example, an individual may avoid spending years pursuing an undesirable career which in the past would have been chosen using the wrong criteria and which would not have chosen if it was determined in advance that such a career choice would not achieve their desired outcomes. Likewise, a business could save millions of dollars by pursuing activities that are proven to create value in advance of their development.

11. The invention described herein insures the user is focused on the whole mission and prevents the user from improving on a specific area while negatively impacting other areas. This discipline forces the user to apply resources and intellect to the areas that will create the optimal solution.

Accordingly, the technology described herein is targeted to improve the decision making, planning and strategic planning capabilities of individuals and businesses. With this invention, individuals can use desired outcomes, predictive metrics, matrix analysis and the power of a computer to assist them in solving complex strategic equations. It enhances an individuals capacity to know, remember, process and apply thousands of pertinent facts when making complex personal and business decisions. In addition, it provides individuals with objective criteria and the insight required to discover new solutions and the optimal strategy.

The structure of the invention comprises a computer system comprising software readable on a compatible computer system, wherein the invention may also include a processor, memory, and user interface. The computer based process for strategy optimization of the present invention provides a means for evaluating and optimizing personal and business strategies that is adaptable to any specified application. The process includes the use of a processor readable medium of instructions, i.e., software, comprising data subroutines which analyze the relationship between sets of data and determinative factors, including desired outcome and predictive metrics, which have been formulated, depending on the specific application, to identify those factors which yield an optimal solution. With the computer program described herein, individuals can use desired outcomes, predictive metrics, matrix analysis and the power of a computer to assist in solving complex strategic equations.

The present invention relates to systematically accelerating the evolution of a process or satisfying a set of desired outcomes. A process is a series of activities or events that produce a desired result, which may comprise a plurality of desired outcomes. All strategies, products or services as well as other solutions are designed to improve or enable a process. Within any given process there exists a finite number of desired outcomes which define the benefits that individuals would realize given the successful execution of the process. The means by which desired outcomes are satisfied will change over time as new solutions are created to improve a given process. Accordingly, all strategies, products and services are actually solutions that are designed to satisfy the desired outcomes of a given process. For any known process, all the desired outcomes that will ever exist, exist today, and new desired outcomes will evolve only as new processes evolve. All individuals involved in a given process share a common set of desired outcomes. What differs from one individual to another is the importance they place on each desired outcome, and the degree to which they perceive each outcome is satisfied with respect to a given process. This importance is quantified by the user whereby the user assigns weighted values to particular desired outcomes and customers. Therefore, opportunity can be uncovered by quantifying which desired outcomes are most important and least satisfied to an individual, a group of individuals with common interests, or the population in general. Value is created by improving an individual's/group's perceived level of satisfaction on one or more desired outcomes based on particular solutions. A core concept of the present invention is that the value of a proposed solution can accurately be determined in advance of its development or actual implementation.

To arrive at a solution, the instant invention processes qualitative and quantitative research in accordance with a user's input. Obtaining the qualitative data that is stored as part of the invention involves conducting statistically valid qualitative research for identifying those characteristics a particular market considers a benefit or of value. Qualitative research involves market research conducted in order to obtain data (e.g. desired outcomes) on a subject of interest. It typically involves interviews with groups or individuals, and is conducted to uncover a particular customer's desired outcomes in connection with the subject of interest. The data from the qualitative research is preloaded and included with the invention. The qualitative research establishes desired outcomes relating to the particular application (e.g. product development) perceived as valuable by a particular market segment; hence, the term "desired outcomes" is used herein to describe what is valued by a specific customer segment. A desired outcome is a benefit of value to a particular customer. It is what the customer requires to obtain satisfaction. It is a statement that defines what the customer wants, why they want it, and how they perceive its satisfaction. A desired outcome is free from solutions or specifications. It is free from vague words such as "easy" or "comfortable," and is stable over time. The present invention contemplates the identification of a finite set of desired outcomes for a given application through statistically proven market research. These desired outcomes are displayed on a visual screen based on the user's selected mission. Values may be preassigned to the desired outcomes to weight their importance, or may be assigned via user inputs. These values may be changed. Values may be based on weighted importance assigned to customers. It is important to note that while the preferred embodiment includes the use of desired outcomes, the invention contemplates the use of any data which indicates what a given market segment values.

The methods used for gathering desired outcomes are based on neurolinguistic programming (NLP). This proven approach captures what customers value and overcomes many of the difficulties associated with traditional methods of gathering desired outcomes. Specifically, for each specific mission identified for evaluation and optimization, research is conducted and information is gathered. In the commercial embodiment, the research involves identifying and gathering data across both external and internal customer sets. An "external" customer set may comprise an individual or group of individuals that will benefit from the evolution of the process. An "internal" customer set may comprise an individual or group of individuals involved in the business of evolving the process. For example, external customer sets for a given product or service are identified and interviewed (e.g., end users in the U.S. market, end users in the European market, etc.). In this manner, desired outcomes are determined for each external customer segment. Internal customer sets are identified (e.g., distributors, manufacturers, etc.) and research is gathered per internal customer set. The research may be as specific as the application requires; for instance, the internal manufacturing set may be further broken down between manufacturers in the U.S., China, etc., and further to specific manufacturing facilities.

Quantitative research facilitates the assignment of a numerical value on desired outcomes and customer sets which allows the user to objectively select a strategy in areas of opportunity. Opportunity can be discovered by quantifying which desired outcomes are most important and least satisfied relative to a particular customer set.

Once desired outcomes have been established for targeted internal and external customer sets, quantitative research is conducted to quantify the importance of each desired outcome for each target customer segment. In the preferred embodiment, the invention processes the quantitative research to establish the importance and satisfaction level of each desired outcome according to each market segment.

Different segments of a particular customer set may place varying levels of importance on a common desired outcome. Likewise, different segments of a particular customer set each may consider that a common desired outcome is currently satisfied to differing degrees. Accordingly, for each customer set segment, data is stored in the computer database.

The resulting quantified information establishes the importance and satisfaction ratings of the desired outcomes with values that can be changed and used in calculations to arrive at a strategy. Desired outcomes which are important and yet unsatisfied are assigned a high rank. Those desired outcomes which are not important and/or satisfied are assigned a low rank. Once the desired outcomes are established and quantified, they are organized in the computer database in predetermined memory locations and are retrievable by the user. A data input capability allows for the expansion of this database.

The second set of factors central to the instant process includes predictive metrics. A predictive metric is a parameter that can be measured and controlled by the individual or organization responsible for satisfying the desired outcomes. A predictive metric is 100 percent predictive of the satisfaction of a corresponding desired outcome. As a parameter it can be tested and benchmarked. It is a proactive metric that is independent of any solution or technology and is also stable over time. Predictive metrics are designed to ensure the solutions and actions produce the desired result.

The present invention contemplates the establishment of a finite set of predictive metrics for a given application. A single predictive metric is defined for each desired outcome identified by the aforementioned qualitative and quantitative research. Predictive metrics are also formulated by market or industry research, and, once formulated, are organized in the computer database in predetermined memory locations. A data input capability allows for the expansion of this database.

Improvements in goods and services, and the formulation of business strategies and optimal decisions, rely on an understanding of the relationship between the predictive metrics and the desired outcomes. Certain predictive metrics drive the delivery of a disproportionate share of value. This occurs when one metric predicts the satisfaction of multiple, important desired outcomes. For instance, predictive metrics A will absolutely predicts desired outcome A, but may also satisfy desired outcome B and C with 80 percent and 70 percent probability, respectively. Conversely, other metrics may predict the satisfaction of only one relatively unimportant desired outcome. Therefore, it is critical that the metrics with the most synergy are used as a criteria to choose between alternative solutions. Establishing these relationships utilizing statistically valid data obtained through market research is a principal function of the present invention.

The ability to: (1) identify customer desired outcomes; (2) rank said desired outcomes in terms of importance and satisfaction; (3) identify corresponding predictive metrics; and (4) establish the relationship between the predictive metrics and the customer desired outcomes by matrix analysis is a process accomplished by the code of the instant invention and one that is too complex for the human mind to process, given the large number of variables be considered. Accordingly, a functional computer software shell is provided for processing the input contained in one or more databases to determine the normalized relationships between the customer desired outcomes and the predictive metrics. The software shell contains all necessary software routines for conducting the matrix analysis, as illustrated in the Figures, to determine the relationships between the predictive metrics and the customer desired outcomes. The resulting output identifies the predictive metrics that predict the satisfaction of a disproportionate share of value as defined by the desired outcomes. It is important to note that a predictive metric may predict the satisfaction of a particular desired outcome, either totally or partially. Accordingly, a metric which partially predicts satisfaction of several important and unsatisfied desired outcomes will typically achieve a ranking higher than a metric which totally predicts satisfaction of a single unimportant, or highly satisfied, desired outcome. Likewise, a metric that predicts total satisfaction of one highly important desired outcome and predicts partial satisfaction of other desired outcomes may achieve a ranking higher than a metric that predicts total satisfaction of a number of non-important desired outcomes.

The functional computer shell of the invention is capable of analyzing data for any application depending on the input contained in the desired outcome and predictive metric database(s). This adaptability of the present software invention to any application for which statistically valid research may be obtained is a principal object of the invention.

The instant invention provides a tool for strategy evaluation and optimization that is adaptable to countless applications. Based on factors that are of particular importance to an individual, the present invention can also be used to define personal strategy, help someone determine whether to make a major purchase such as a boat, to select the model of boat that will best suit a person's lifestyle, or to help one choose a career path.

In addition, the present invention can be used to define business strategy, develop new and improved products, identify marketing channels, and identify product features that will deliver the most value to the customer. As each of the aforementioned applications potentially require the consideration of many more factors than can be processed by the human mind, the present invention provides an improved means for strategy evaluation and decision optimization.

In accordance with these and other objects which will become apparent hereinafter, the instant invention will now be described with particular reference to the accompanying drawings.

BRIEF DESCRIPTION OF THE DRAWINGS

FIG. 3 depicts a screen for allowing the user to select and assign scaled weighing to internal and external customer sets.

FIG. 4 depicts a screen for allowing the user to set a target satisfaction value for each desired outcome.

FIG. 5 depicts a screen which displays desired outcomes listed in order of importance.

FIG. 6 depicts a screen which displays predictive metrics prioritized with respect to the desired outcomes.

FIG. 7 depicts a screen capable of displaying detailed information about a specific predictive metric.

FIG. 8 depicts a screen for allowing the user to define various options for evaluation.

FIG. 9 depicts a screen for defining a baseline option against which all others will be compared.

FIG. 10 depicts a screen for evaluating specific options relative to the baseline option.

FIG. 11 depicts a screen for displaying the results indicating the degree to which specific options satisfy desired outcomes.

FIG. 12 depicts a screen for allowing the user to improve various options.

FIGS. 19a and 19b represent actual data including desired outcomes and unprioritized predictive metrics in connection with an internal customer segment (management) and the process of doing business.

FIGS. 20a and 20b represent the data of FIG. 19 wherein the predictive metrics are prioritized in terms of importance and satisfaction.

FIGS. 22a and 22b represent an evaluation of competing strategies using the prioritized predictive metrics of FIGS. 19 and 20.

FIGS. 23a and 23b represent the establishment of yearly goals in connection with the prioritized predictive metrics.

DESCRIPTION OF THE PREFERRED EMBODIMENTS

Figure 17:
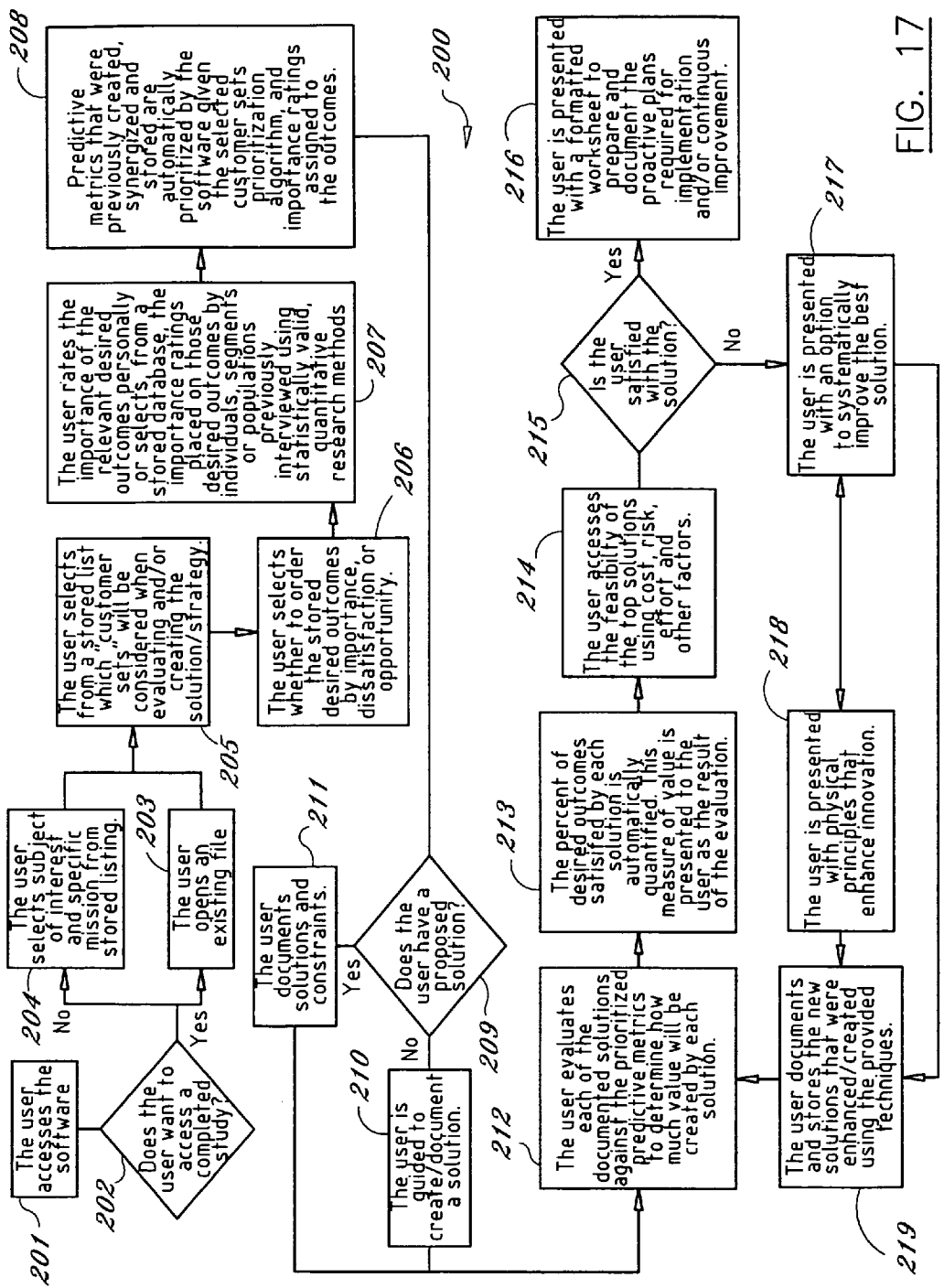
FIG. 17 is a detailed code level flow logic diagram of the instant invention.
Figure 18A:
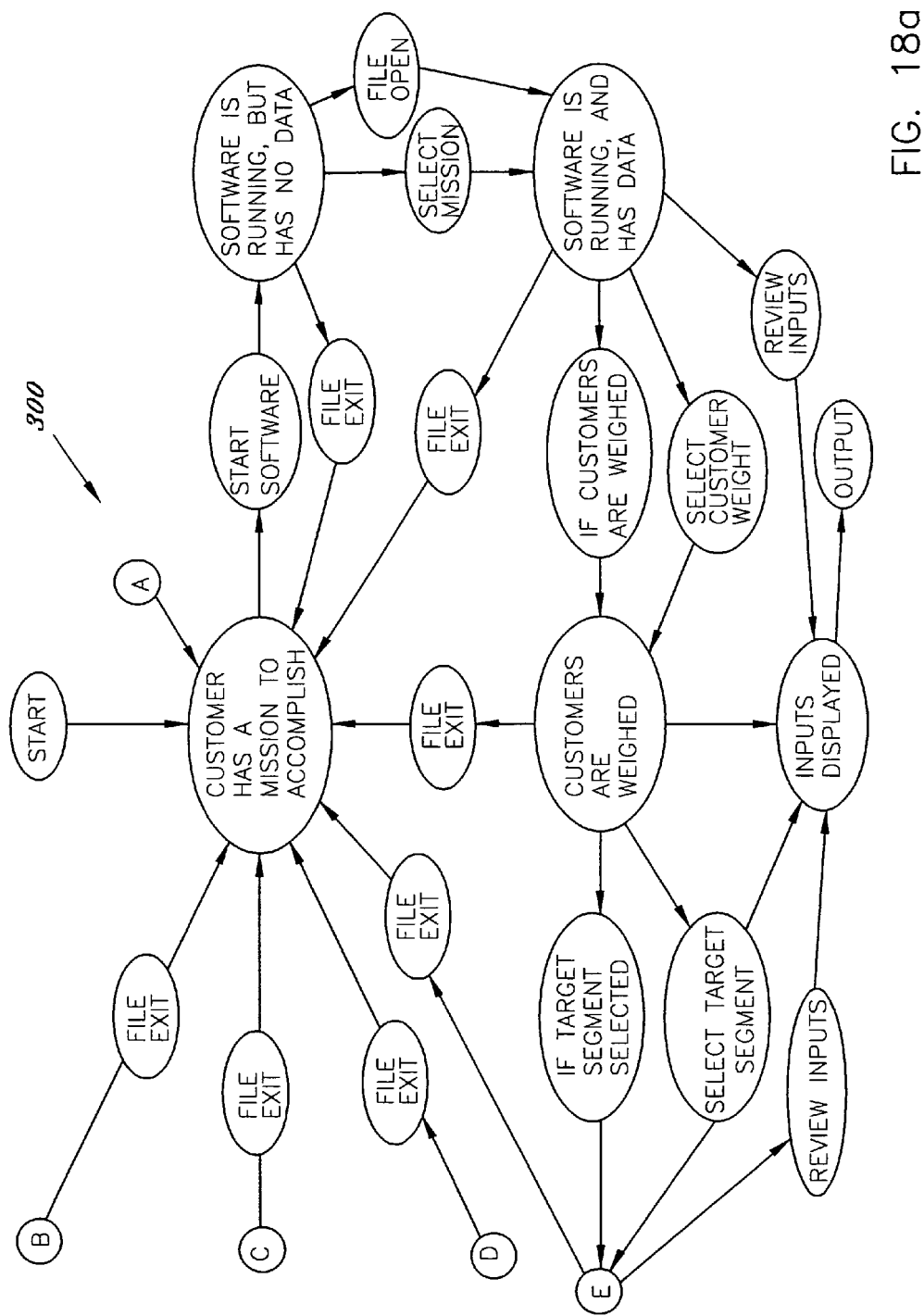
FIG. 18 is a state transition diagram of the instant invention illustrating the menu selectable options.
Figure 18B:
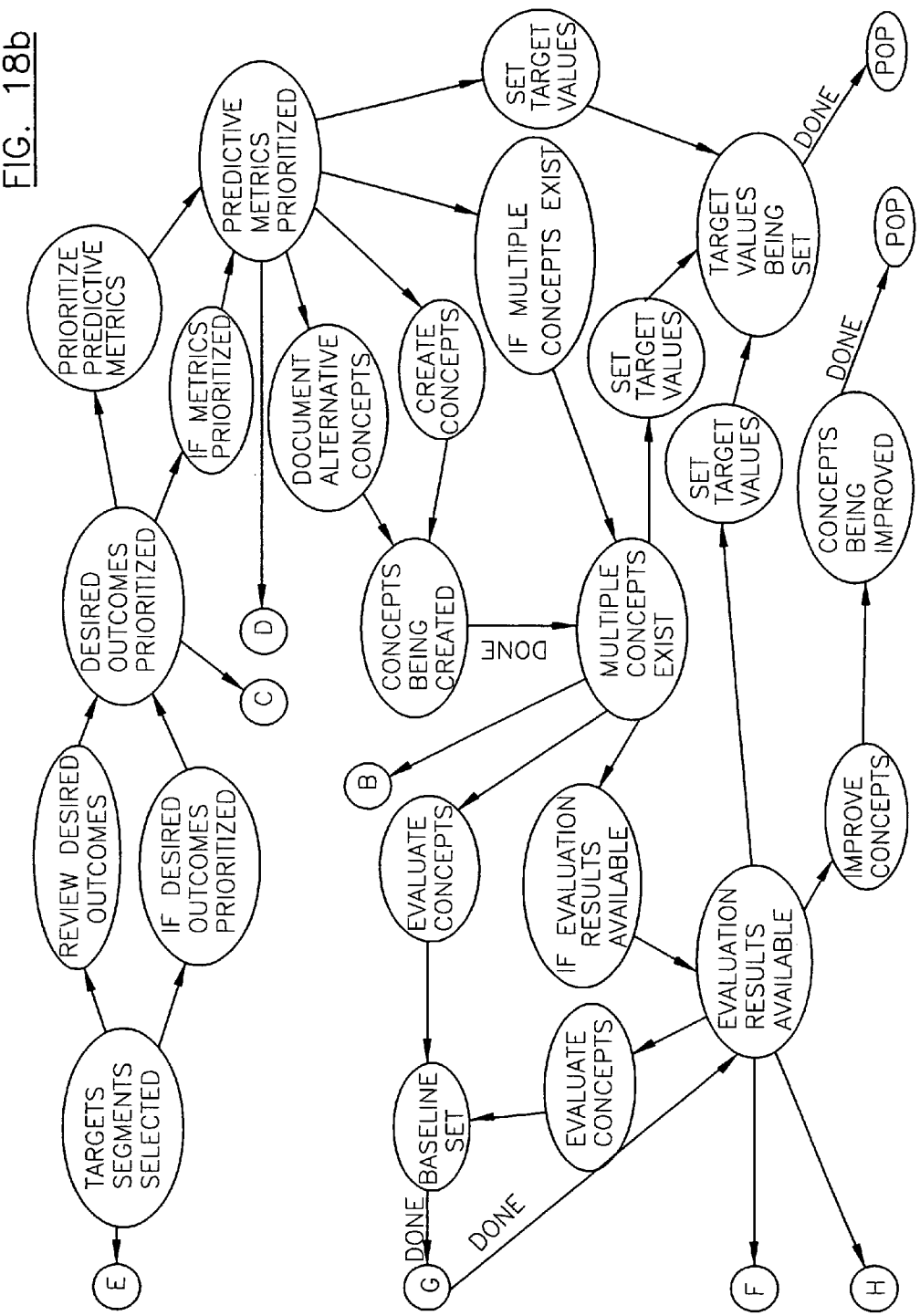
Figure 18C:
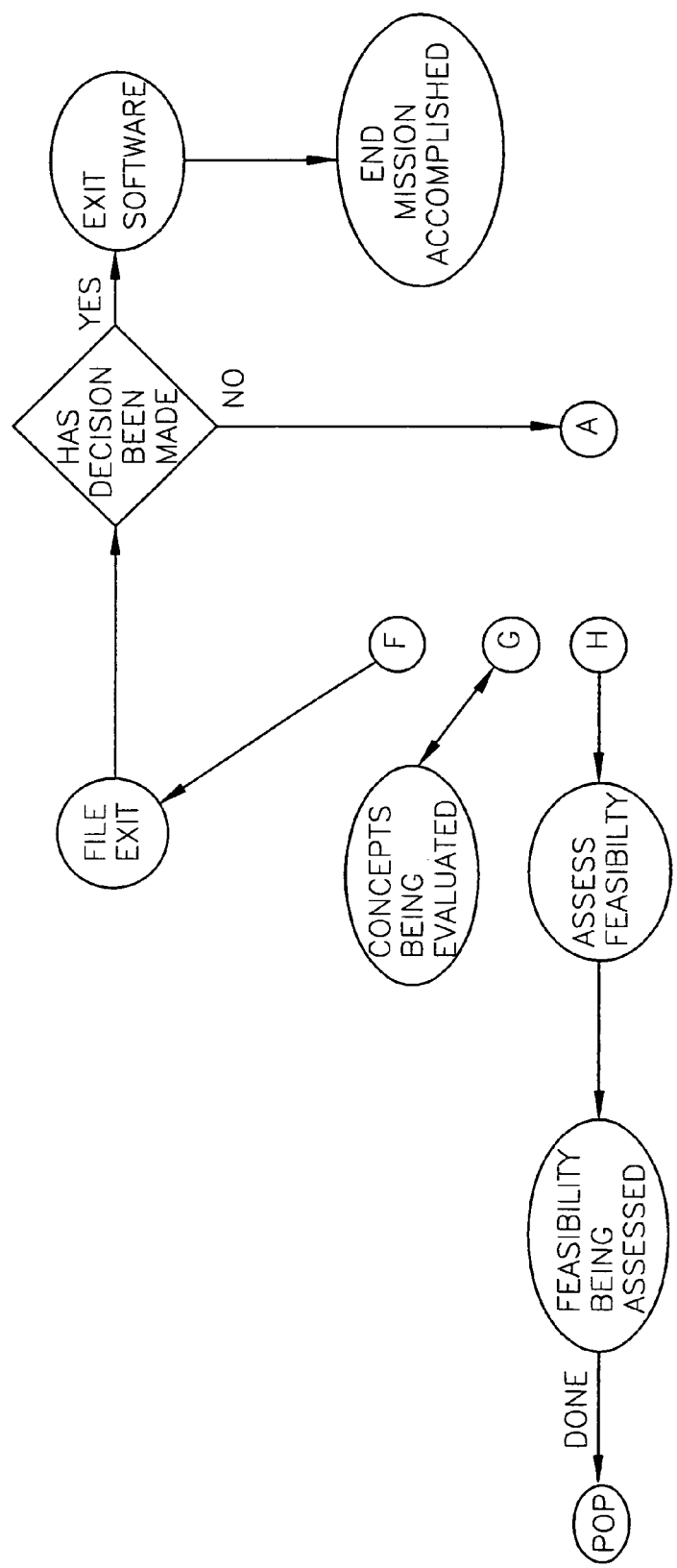

With reference to the drawings, FIGS. 1-18a-c depict the preferred embodiment of the instant invention, which is generally referenced by numeral 100. The software of the present invention for implementing the process for strategy evaluation and optimization has been designed and implemented on a personal computer system, however, other computer systems can also be used to implement the process. The process is hardware and code independent and is, therefore, illustrated in flow chart and example form to provide a full understanding of the invention. The system and code logic of the invention 10 is shown in general form in FIGS. 14-18. Referring to FIG. 17, the flow chart of the software is generally referenced by numeral 200. With reference to FIG. 18, a state transition diagram 300 is shown, illustrating the menu driven features of the instant invention. In the state transition diagram 300, the user may exercise a number of options as shown.

The computer program of the present invention is loaded into the hard disk, RAM, or other memory means of a computer from a floppy disk, diskette, CD-ROM, or other storage means. Instructional materials and operational manuals are provided to assist the user during installation. Once installed, the computer program is booted-up by execution of the appropriate commands.

The computer program includes two functionally different components: (1) a database input loader allows for input and storage of data for use in evaluating specific strategies for expanding the applications database, and (2) a functional shell includes the necessary routines for accessing the data and conducting the mathematics and matrix analysis necessary for strategy evaluation. The incorporation of an input module and a functional shell is critical for the conformance of the software invention to any application for which suitable research data exists, or for user entry of personal preferences or desires. The instant invention provides a software design comprising, a means for receiving data, a means for storing the data in predetermined distinguishable memory locations, means for accessing data, based on user impacts, user interface means, and means for processing data including means for performing matrix analysis between selected data, means for assigning predetermined values to selected data, and means for arriving at a final decision or strategy value based on software operated calculations.

The computer program is delivered to the user having desired outcome and predictive metric data pre-loaded. An example of desired outcomes and predictive metrics may be found in the Figures. The weighted numerical values assigned to the desired outcomes and predictive metrics are based on deployment normalization calculations as described in International TechneGroup Inc.'s paper entitled "Deployment Normalization" by Dilworth Lyman and Robert Hales, the content of which is incorporated herein by reference. While such calculations may be known, the instant invention makes it available in a modified, user friendly computer based format and incorporates novel methods of sorting and dividing the acquired data. Research must be complete with results quantified and loaded into the proper application data base memory locations before delivery to the ultimate user. The following description explains the research and methodology for a given application.

I. Establishing and Quantifying Desired Outcomes

Initially, the present invention contemplates the identification of a finite set of customer desired outcomes for a given application. Specifically, for each specific application, or mission, identified for evaluation and optimization, qualitative research is conducted and information is gathered and quantified.

A. Primary Customer Sets

The commercial embodiment of the process is structured around understanding the desired outcomes of typically two primary customer sets: (1) the external customer; and (2) the internal customer. External customers comprise individuals or groups that will benefit from the evolution of a given process, and may include end users, purchasers, retailers, or any other suitable customer group. Internal customers comprise individuals or groups involved in the business of evolving the process, and may include manufacturers, investors, management, or any other suitable group.

In the commercial embodiment of the instant example, the internal and external customer environments are analyzed, utilizing statistically valid research techniques, to determine and quantify what the external customers value. This research involves gathering customer desired outcomes from a sample of individuals that represent the potential target market for various market segments. The following description will refer to a typical commercial example whereby the application relates to the development of a "commercial product." It should be recognized, however, that the following example is not limiting, as a principal aspect of the present invention is the adaptability of the software for any application.

1. External Customers

The external customer sets for a specific commercial product are identified and qualitative research is conducted, typically through interviews (e.g. customers in the U.S. market, customers in the European market, etc.). In this manner, external customer desired outcomes are determined for each external customer set. Quantitative market research then establishes what specific desired outcomes are important to each specific customer set as customers in the United States may value particular benefits or desired outcomes differently than customers in Europe, Canada, etc.

The quantitative market research is conducted through interviews with a representative sample of the target market. The external customers are often "end users" and individuals responsible for making the decision to purchase the organization's products or services. This statistically valid research is conducted by data collection experts using telephone, personal interviews or any other suitable techniques.

The research is completed across a geographic area of interest and the organization is not identified as the sponsor of the study. The most advanced, proven collection and scaling techniques are used to ensure data validity and strong discrimination. Furthermore, as discussed above, each market may be further segmented geographically (e.g. customers in the U.S., the southern U.S., Florida, South Florida, etc.) or by any suitable means including the use of advanced cluster analysis techniques where the basis for segmentation is the customers desired outcomes. The market may be segmented by what different customers value. Using customer desired outcomes as the basis for segmentation enables an organization to assess market opportunity with precision, and design products and services that address unique market needs. The results of the segmentation analysis often reveal the existence of segments that cut across traditional classification schemes. Each of these segments represents a new market opportunity. The computer program using the instant process will then utilize this information to allow the user to identify the most attractive segments to target.

Figure 19B:
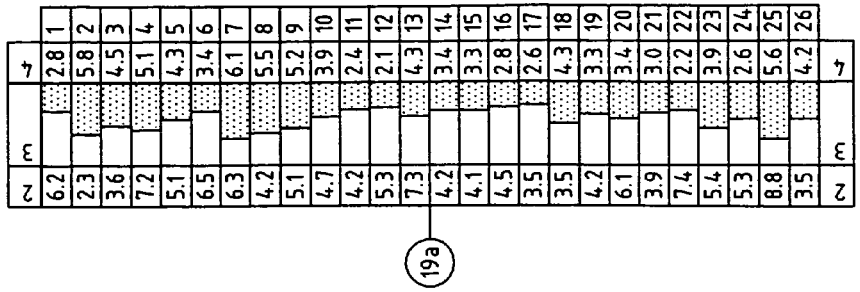

An example of actual desired outcomes is shown in FIG. 19 (left hand column) for the internal customer of management set in connection with the mission of the process of doing business.

For each market segment for which research data is obtained, that data is quantified and prioritized. For example, the desired outcomes identified for a particular market segment are ranked in terms of those desired outcomes that are important yet unsatisfied being assigned a high rank, while those desired outcomes that are non-important and/or satisfied being assigned a low rank.

Figure 20A:
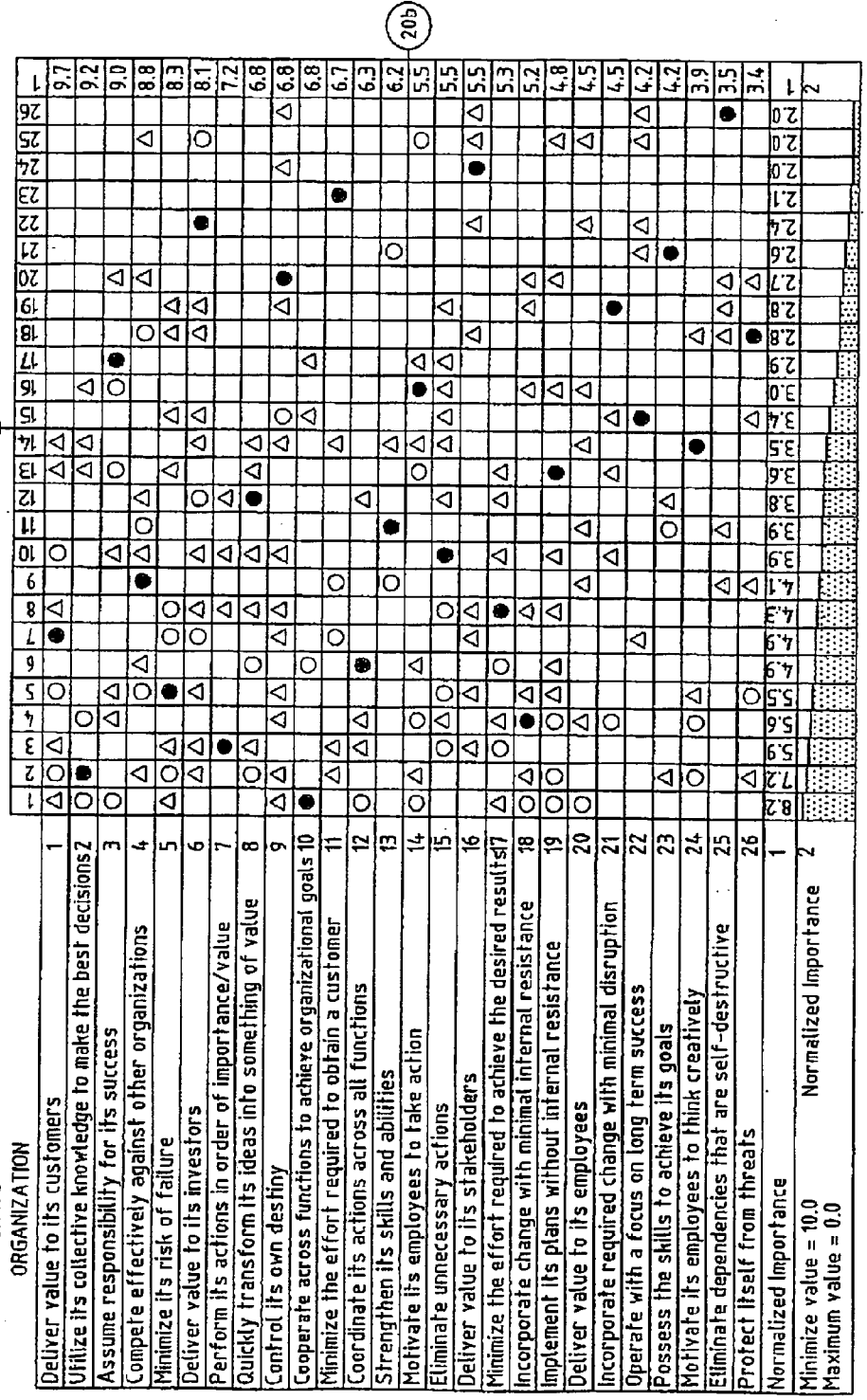
Figure 21:
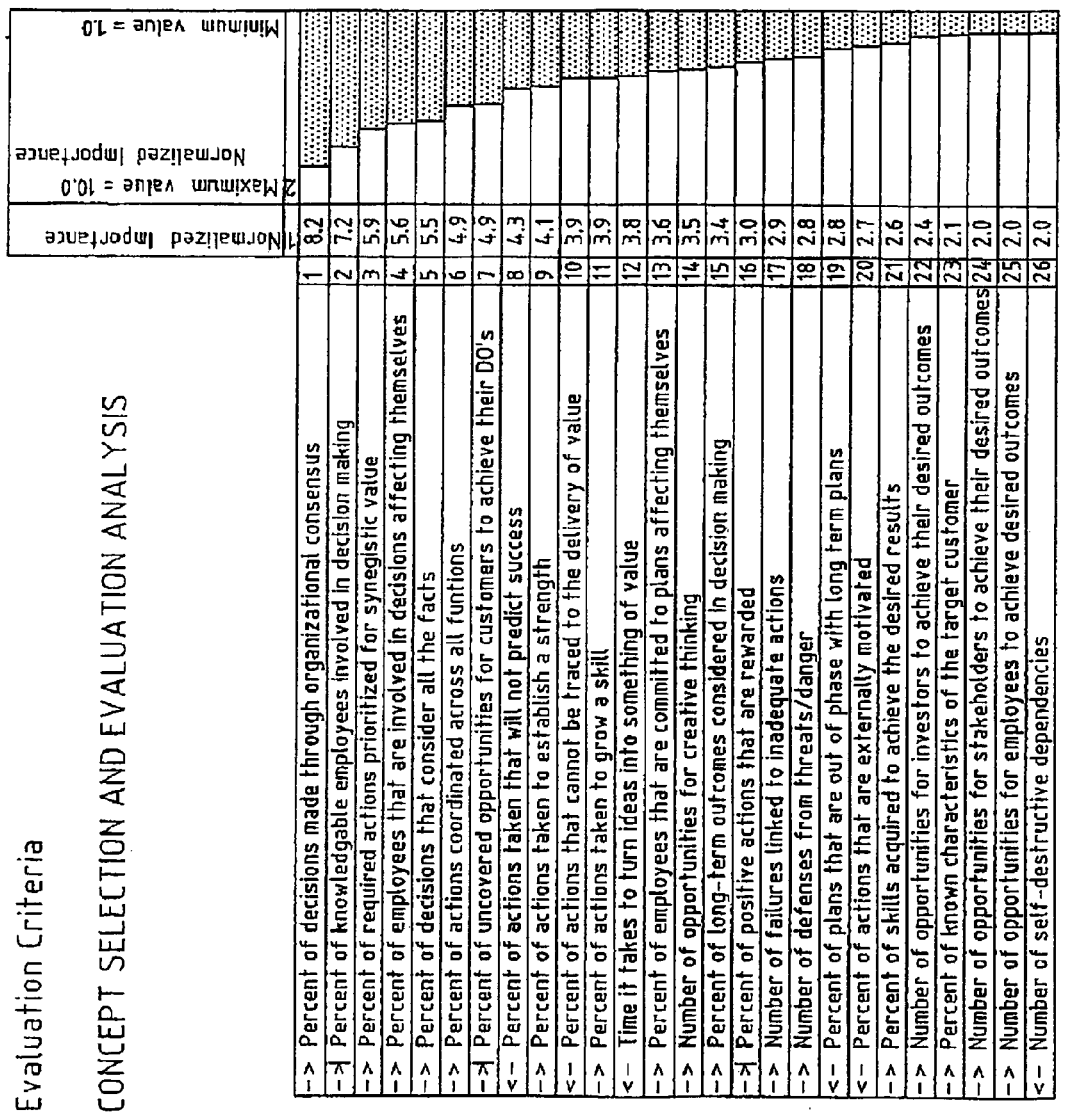
FIG. 21 is a listing of the predictive metrics of FIG. 20 prioritized and ranked in terms of normalized importance.

An example of desired outcomes ranked in terms of importance and satisfaction shown in FIG. 20 wherein the desired outcomes shown in FIG. 19 have been ranked in terms of importance and satisfaction as described above.

2. Internal Customers

In the commercial embodiment, the internal customer environment is also analyzed for use by the instant invention. The internal customer may comprise stakeholders (e.g. investors), management, production, etc. An internal customer is an individual or group involved in the business of evolving a process.

For example, a stakeholder may include a manager, non-manager, designer, sales person, board member, or investor. The stakeholder environment is analyzed to uncover and evaluate stakeholder desired outcomes in connection with a product or service. The stakeholder's outcomes may be strategic in nature or involve cost, quality or timing issues. The objective is to ensure that the selected product or service delivers value to the stakeholder as well as the external customer. As with the external customer, the stakeholder environment may also be segmented.

First, representatives from each function within the organization are interviewed to uncover their desired outcomes utilizing NLP techniques. These outcomes are captured and prepared for quantification. The desired outcomes are then prioritized for importance by representatives of each functional organization as previously described in accordance with satisfaction and importance levels.

Likewise, internal customers such as production may be included in the research. Production is analyzed to insure the resulting product or service can be manufactured or delivered. Using NLP, desired outcomes are captured from the individuals responsible for the delivery of the resulting product or service. The objective of this analysis is to ensure that production and delivery is considered in the planning phase of the project, and that the solution will be free from production or delivery issues. The desired outcomes obtained are prioritized for importance by representatives of the production or delivery organization.

Production desired outcomes are considered in conjunction with external customer desired outcomes, however, external customer outcomes are often given more weight. The ultimate goal is to create a concept that delivers value to the customer and also satisfies stakeholder and production desired outcomes.

Production environment research may be as specific as the application requires; for instance, the production environment may be segmented between manufacturers in the U.S., China, etc., and further segmented to specific manufacturing facilities in each country.

The desired outcomes from the above-referenced customer sets are quantified to establish importance ratings of the desired outcomes whereby those desired outcomes which are important yet unsatisfied are assigned a high rank, while those desired outcomes which are not important and/or satisfied are assigned a low rank. Once the desired outcomes are established and ranked, they are organized into a computer database which is pre-loaded into the computer memory, or stored on a data storage means before delivery to the user. See FIGS. 19 and 20.

II. Predictive Metrics

The present invention further contemplates the establishment of a finite set of predictive metrics for a given application. Predictive metrics are measurable parameters that predict a desired outcome will occur. A single predictive metric is defined for each desired outcome; however, as each metric may predict, to some extent, the satisfaction of more than one desired outcome, each metric is assigned a predictive relationship value for each desired outcome depending upon the degree with which that metric predicts satisfaction of that particular desired outcome. Accordingly, each predictive metric is also assigned a cumulative predictive value which represents the strength of the predictive metric with respect to the degree to which the predictive metric predicts satisfaction of all of the prioritized desired outcomes.

The predictive metrics are formulated by market or industry research, and, once formulated, are organized into a computer database. Once collected and organized, the data is loaded into the software prior to delivery to the user. FIG. 19 illustrates actual data wherein desired outcomes are listed down the left hand column (nos. 1-26) and corresponding predictive metrics are listed from left to right across the top (nos. 1-26). This data was obtained for an internal customer set (management) in connection with a mission involving the process of business. Note as seen in FIG. 19 for each desired outcome there is a corresponding predictive metric established which strongly predicts (strength of prediction indicated by solid circle) delivery of the desired outcome. In addition each metric is assigned a predictive value relative to each desired outcome. In the data shown in FIG. 19 the ability of each predictive metric to predict the success of each desired outcome is indicated by strong, moderate, and weak indicators which are graphically represented by a solid circle, a circle, and a triangle respectively, which correspond to numerical values (9, 3, and 1, respectively). Turning now to FIG. 20, the prioritizing of desired outcomes in terms of importance and satisfaction results in the realignment of predictive metrics in terms of normalized importance. Accordingly, those desired outcomes which are important and unsatisfied are highly ranked, while those desired outcomes that are unimportant and/or currently satisfied are ranked low; and, predictive metrics are realigned such that those metrics which strongly predict the delivery of one or more highly ranked desired outcomes are found to the left hand side of FIG. 20 (high normalized importance), while those predictive metrics which predict delivery of relatively low ranked desired outcomes are found to the right hand side of FIG. 20 (low normalized importance).

Figure 14:
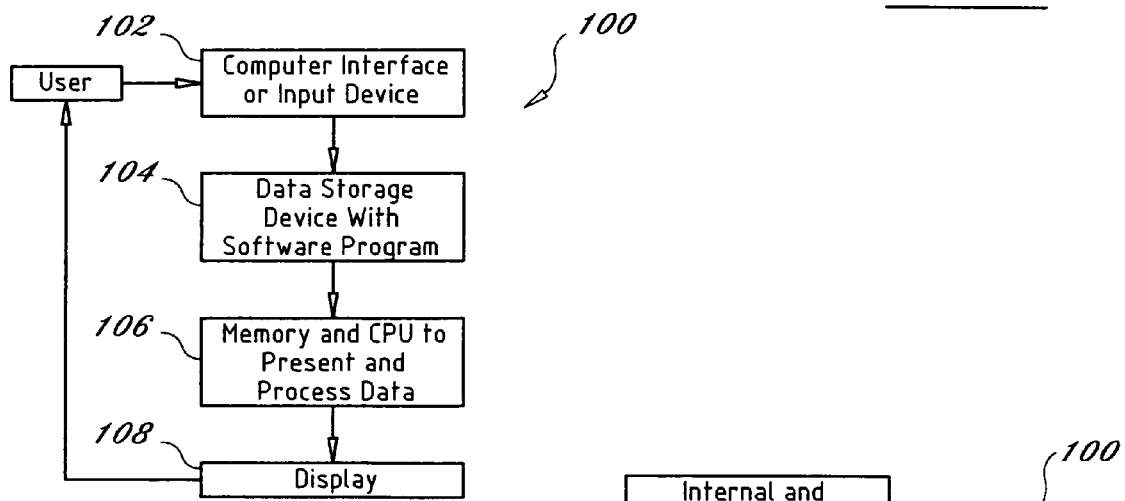
FIG. 14 is a basic system level logic diagram for the instant invention.
Figure 15:
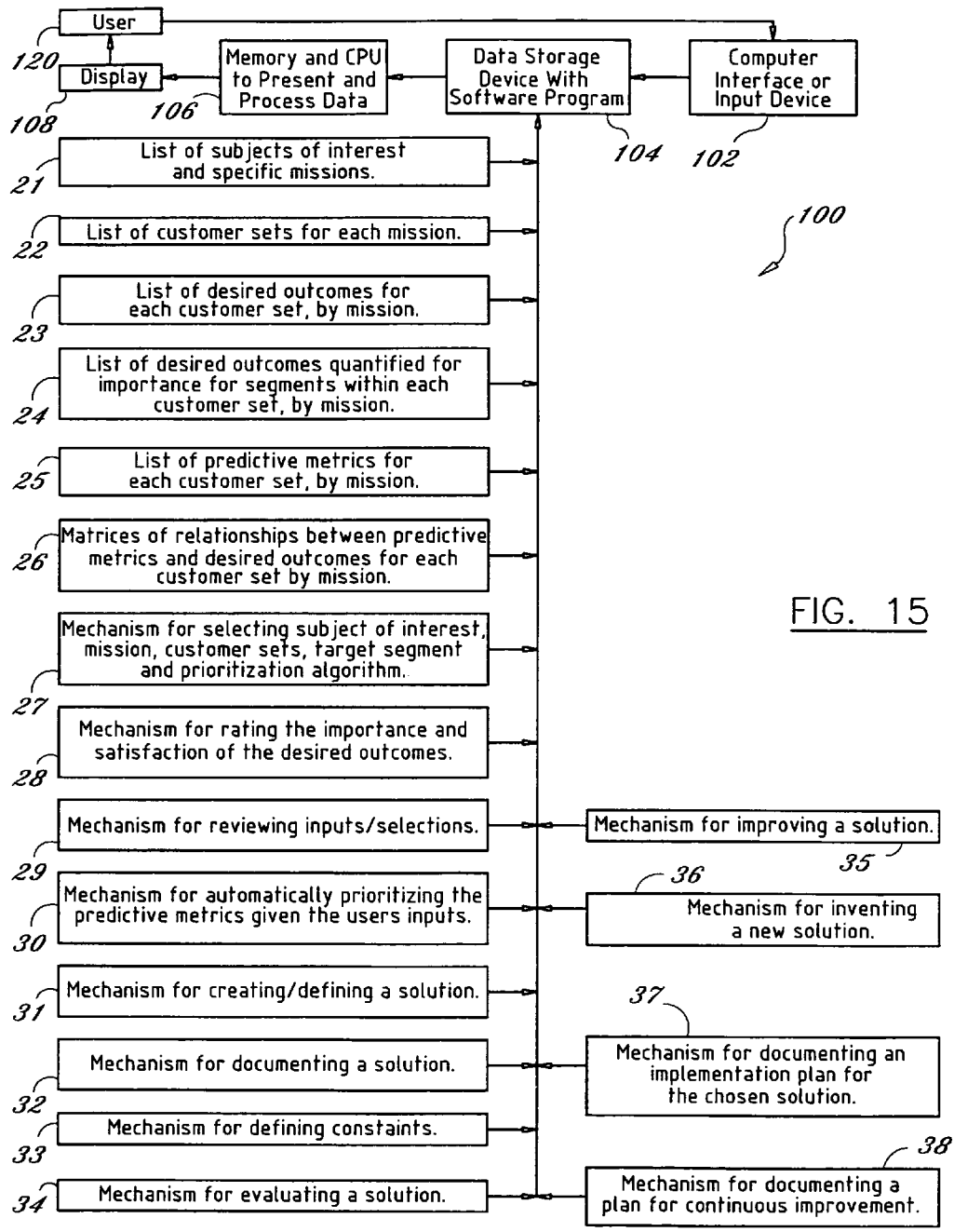
FIG. 15 is a detailed system level logic diagram for the instant invention.

With reference to FIG. 14, the basic system of the instant invention is shown. The basic system level logic for the creation and optimization of solutions and strategies comprises a user interface, a computer interface or input device 102, a data storage device 104 with software program, memory and CPU 106 to present and process data, and a visual display 108. The user is to access the software using established computer technologies. The data in the software has the properties of digital information in that it can be stored, transferred, updated, modified, presented and applied using existing and future digital, computer and networking technologies. A more detailed system is shown in FIG. 15. Referring to FIG. 15, the data storage device stores the software and data as generally shown in the attached blocks 1-18. The mechanism blocks 127-138 shown are essentially the subroutines which manipulate the stored data in accordance with user inputs. The data is stored in locations represented by blocks 121-126.

Turning now to FIGS. 1-14, and by way of the following example, based on an embodiment directed toward business strategies, operation of the software of the instant invention shall be described.

B. Software Operation

Figure 16:
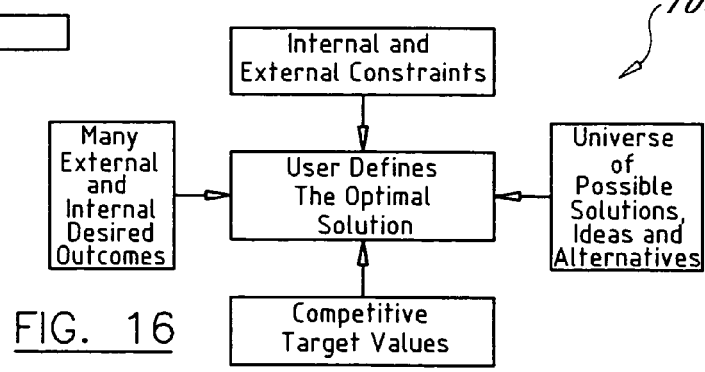
FIG. 16 is a basic code level flow logic diagram of the instant invention.

Referring to FIG. 16, the basic code level for the creation and optimization of solutions and strategies is shown in accordance with the instant invention. The detailed system logic is illustrated in FIG. 17. The objective of the code level logic is to present the user with the data that is required to create and quantify the value of a proposed solution in advance of its actual implementation, and to insure that the chosen solution is not only competitive, but that it does not violate any constraints imposed by the user or others.

The logic is to set up an equation that can be solved to find the optimal solution for any point in time. With reference to FIG. 16, the constraints, desired outcomes, and target values are treated as constants in this equation and the universe of solutions is treated as a variable as new solutions are made available over time with the introduction of new ideas, technologies, and alternatives.

Given that hundreds of possible solutions, ideas, and alternatives exist for any strategic situation, the user is guided to find, define, create, or invent the solution that will best satisfy the desired outcomes of those involved in that situation. The optimal solution at is the one that will deliver the most value given the effort, risk, and cost that the user is willing to expend.

Figure 1:
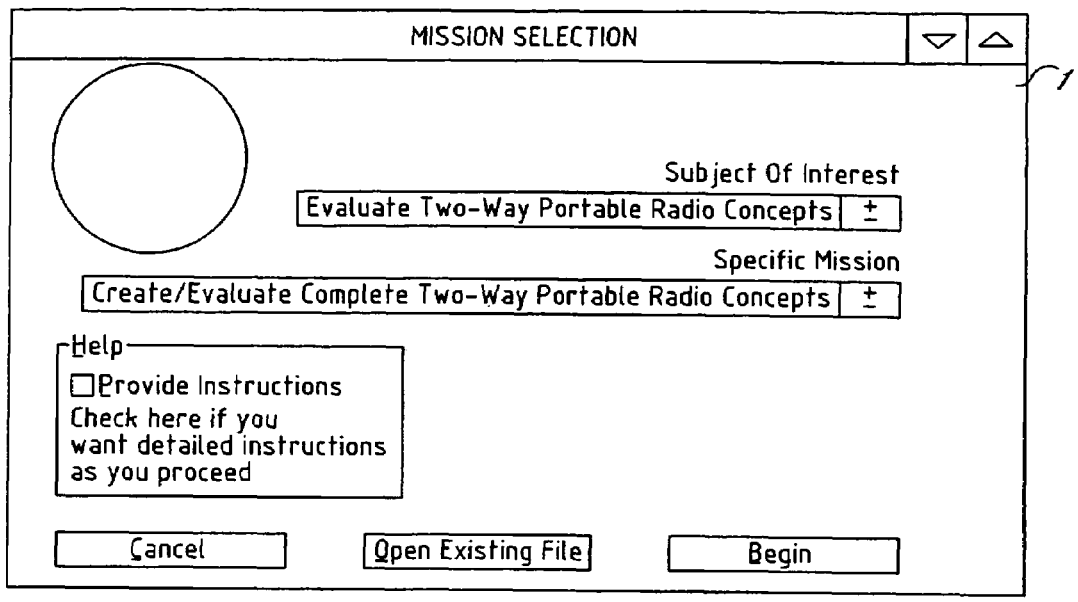
FIG. 1 depicts the Mission Selection screen of the present invention.

As depicted in FIG. 1, Screen 1: The first screen display allows the user to select among a number of specific subjects and specific missions or applications to be analyzed. For example, developing a new or improved product, such as a two-way portable radio concept. The user selects the desired subject of interest and a mission from the subset of specific missions for which research data exists by using an input selection means such as a computer mouse, or keyboard. The computer program allows for a plurality of independent subjects and missions to be stored. The database of stored subjects and missions, thus, may be expanded and expansion is only limited by data storage capabilities. Furthermore, as will soon be apparent the computer program allows the user to store the results of various studies, accordingly, the user can maintain a library of studies, each giving emphasis to specific goals, and each predicting that a particular device will best satisfy the goals identified and selectively weighted by the user, as further discussed below. In this example, the development of an improved two-way portable radio concept is selected.

Figure 2:
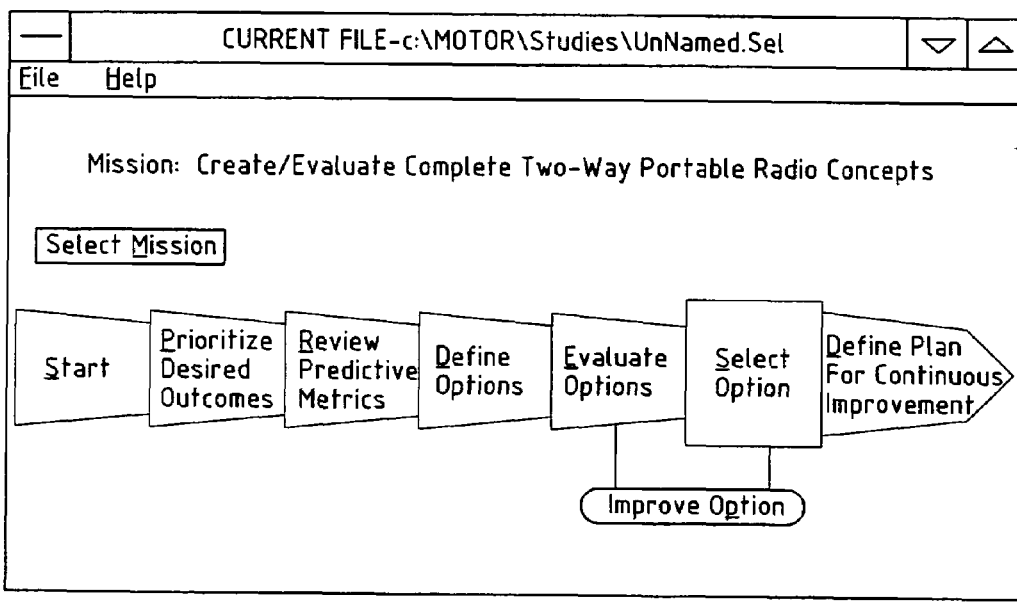
FIG. 2 depicts a screen illustrating a flow-chart for the mission selected.

Referring to FIG. 2, Screen 2: The second screen display 2 indicates the particular mission that the user has selected (e.g. Create/Evaluate Complete Two-Way Portable Radio). Each study may be named using alpha-numeric indicia (e.g. study 1, study 2, or device with feature A, features A and C, etc.), and a detailed description of this study may be input and stored. A flow-chart "roadmap" of the process, as it applies to the specific application, highlights the users progress and may be incorporated into one or more of the display screens. The flow chart is illustrated in FIG. 2. A more detailed flow diagram is depicted in FIG. 17.

Referring to FIG. 3, Screen 3, the third screen display 3 lists Internal and External customer sets for user selection and importance weighing.

For example:

| | |
|---|---|
| External Customers: | (1) Canadian End Users; |
| | (2) Canadian Purchasing Agents; |
| | (3) U.S. End Users; |
| | (4) U.S. Purchasing Agents; etc. |
| Internal Customers | |
| Stakeholders: | (1) Long Term Investors |
| | (2) Short Term Investors |
| | (3) Management |
| | (4) Bond Holders; etc. |
| Production: | (1) U.S. Manufacturing Facilities |
| | (2) U.S. Manufacturing Facility No. 1 |
| | (3) U.S. Manufacturing Facility No. 2 |
| | (4) Korean Manufacturers |
| | (5) Korean Manufacturing Facility No. 1; etc. |

As previously discussed, the user may now select between segments of each customer set. For example, the user may desire to analyze the development of the improved product in connection with the following customer set or market segments:

| CUSTOMER SET | SEGMENT |
|---|---|
| EXTERNAL CUSTOMER SET: | CANADIAN END USERS |
| INTERNAL CUSTOMER SET: | LONG TERM INVESTORS |
| INTERNAL CUSTOMER SET: | U.S. MANUFACTURING FACILITY NO.1 |

In the alternative, the user may select to analyze the development of the improved product in connection with the following customer segments:

| CUSTOMER SET | SEGMENT |
|---|---|
| EXTERNAL CUSTOMER SET: | CANADIAN END USERS |
| INTERNAL CUSTOMER SET: | MANAGEMENT |
| INTERNAL CUSTOMER SET: | KOREAN MANUFACTURERS |

As previously discussed, for each customer segment above, qualitative and quantitative research has established and prioritized desired outcomes, which data is stored in a computer database. Furthermore, for each customer set, predictive metrics have been formulated corresponding to the desired outcomes, which data may also be stored in a computer database, or any other suitable data storage means.

As further depicted in FIG. 3, once the user has selected the particular customer set for analysis, an importance rating is assigned to each customer set to weigh the analysis in favor of, or against, one or more customer sets. In the preferred embodiment, importance ratings for each customer set are scaled (e.g. from 0 to 10, or 0 to 100) such that the sum total for all customer sets equals the range maximum (i.e. 10 or 100). Thus, with all else being equal, increasing the importance rating for a given customer set requires decreasing the importance rating for one or more other customer sets. The user assigns said customer set importance ratings by appropriate commands through a suitable input device (e.g. mouse, keyboard, etc.). The computer program may also include default values for the importance ratings. Thus, for example the user may elect to assign importance ratings as follows:

| CUSTOMER SET | SEGMENT | IMPORTANCE |
|---|---|---|
| EXTERNAL CUSTOMER SET: | CANADIAN END USERS | 6 |
| INTERNAL CUSTOMER SET: | MANAGEMENT | 1 |
| INTERNAL CUSTOMER SET: | KOREAN MANUFACTURERS | 3 |

In a preferred embodiment, importance ratings are assigned by the user by adjustment of displayed sliding scales which are responsive to keyboard commands, or the commands of a computer mouse, or any other suitable input means. Accordingly, each customer set is weighted according to relative emphasis, and the user is able to increase/decrease the consideration importance, or weight, by adjusting slider displays by way of input commands. Customer sets assigned a value greater than zero are evaluated further, while customer sets assigned a zero value are not utilized in further process calculations. The sliders may each have a corresponding range from 0 to 10, and calculation routines automatically determine and display the relative rank of each customer set based on the weight selected by the user.

Furthermore, secondary screens (not shown) may be displayed which provide more detailed information concerning a particular customer set such as the exact make-up or other information that may be of interest to the user. Once the ratings are established the user continues the process by selecting a "done" button whereby the flowchart disclosed in FIG. 2 may be displayed indicating the stage of the process completed.

Referring to FIG. 4, Screen 4, the fourth screen 4 allows the user to review the subset of desired outcomes associated with each selected market segment of each customer set that has been assigned a positive or importance rating on screen 3. This screen provides a display comprising a sorted list of the desired outcomes prioritized using the following formula:

PRIORITY=(IMPORTANCE−SATISFACTION)+ IMPORTANCE

While the formula disclosed directly above is contemplated in the preferred embodiment, it may be desirable, in certain applications to prioritize desired outcomes based on pure importance or dissatisfaction.

It is important to note that, as to the desired outcomes, Importance and Satisfaction ratings result from the qualitative and quantitative market research. Accordingly, priority ranking is automatic. (See, e.g. FIG. 20 wherein desired outcomes are ranked down the left hand column). The above referenced formula results in increasing the priority of those desired outcomes which the customer segment considered unsatisfied, while decreasing the priority of those desired outcomes the customer segment considers satisfied or non-important. A print option allows the user to obtain a hard copy printout for review and evaluation. The user may advance to the next screen by signaling a "done" input. Upon completion of this screen the main window of screen 2 is displayed indicating the stage of the process completed.

In an alternate embodiment directed to personal strategies it may be desirable to enable the user to input importance and satisfaction ratings as they relate specifically to the user. For example, in connection with a personal growth category there may be as a Desired Outcome—"Understand Yourself Relative to Others." The user then selects the importance of "Understanding himself relative to others" and the current level of satisfaction by use of adjustable slider displays as previously discussed. As the user selects and adjusts the importance of each desired outcome, the software automatically calculates, updates, ranks, and displays the most important and least satisfied personal desired outcomes. Thus, the user is able to prioritize his/her desired outcomes consistently. The user advances between desired outcomes using next desired outcome/previous desired outcome input options. Upon completion of this screen the flowchart screen is displayed indicating the stage of the process attained.

In the commercial embodiment it is not always desirable to allow the user to adjust the importance/satisfaction ratings assigned to desired outcomes as these values are the result of quantitative market research, and, hence, what is important to the software user is of no significance.

Referring to FIG. 5, Screen 5, the fifth screen 5 displays the desired outcomes (identified as requirements in FIG. 5) for all of the selected customer sets in sorted order of importance of consideration taking into account the weighing assigned to each customer set.

Referring to FIG. 6, the sixth screen 6 relates to the specific metrics that predict satisfaction of the user's desired outcomes ranked in order of normalized importance. The metrics list is displayed in prioritized and sorted order. The prioritization is calculated using the proportional distribution method NORMTI using the calculated importance of the desired outcomes. Accordingly, the predictive metrics are listed in order of importance of consideration for evaluating options taking into account the calculated importance of desired outcomes. In essence, those metrics which yield a disproportionate share of customer desired outcomes (i.e. those metrics which satisfy important customer desired outcomes) are assigned a high priority, while those metrics which yield a relatively low share of customer satisfaction (i.e. those metrics which only partially satisfy one or more customer desired outcomes of little importance) are assigned a low priority. (See, also FIGS. 20 through 23).

This screen includes options that allow the user to review a detailed description of each of the metrics, however, the user does not have the ability to adjust the ranking of the metrics directly as the metrics are prioritized depending upon the desired outcomes prioritization. Upon completion of this screen the flowchart screen may be displayed indicating the stage of the process completed.

Referring to FIG. 7, Screen 7 is a secondary screen displayed if the user desires more detailed information about one or more metrics. The detailed information normally would appear in the box identified as "metric description." Screen 7 is optional and is reached only when the option is selected from screen 6. The user has the ability to select any and all of the metrics for such detailed review. When the user has finished reviewing detailed metric descriptions, the program returns to screen 6.

Referring to FIG. 8, Screen 8 is identified as an options screen. In this screen, the user defines one or more options that are available. The screen allows for each option to be defined or otherwise described in detail and identified by a short option title. A spell check feature assists the user in producing error free option descriptions. Upon completion of this screen the flowchart may be displayed indicating the stage of the process attained.

Referring to FIG. 9, Screen 9 allows the user to compare all of the options previously defined in order to determine which would best satisfy the user's desired outcomes. The user selects what is considered to be the best option available as a baseline option against which all others will be compared. This screen also includes an option for allowing the user to evaluate options using a percentage of the predictive metrics. This is desirable as a relatively small percentage of the predictive metrics predict the satisfaction of most desired outcomes. (See, e.g. FIG. 21, wherein the top nine of the twenty-six metrics predict satisfaction of over half of the desired outcomes based on normalized importance).

Referring to FIG. 10, Screen 10 allows the user to select each option analyzed in turn, and then, compare a selected option to the baseline option to determine which option is best. The scale is: Better than baseline, Worse than baseline, or equal to baseline. Thus, for each option, the user compares each option to the predictive metrics from the prioritized predictive metric list for the purpose of evaluating how the option under evaluation compares to the base option. For example, if the option under evaluation (option 1) increases the percent of time the device can access the desired receiver (prioritized predictive metric 1) better than the baseline option, the user enters that indication using a suitable input device in the option rating column. Upon completion, the flowchart screen may be displayed for informing the user of the stage of the process attained.

Referring to FIG. 11, Screen 11 displays the results indicating the relative ratings of the various options. The options are sorted based upon the sum of their ratings against each of the metrics and biased by the relative importance of each metric. A positive rating indicates that a particular option is better than the baseline option selected. The user is encouraged to re-evaluate using different baseline options and to refine options by either adding new options or modifying the options currently defined as shown in screen 12 below.

In FIG. 12, Screen 12 displays a selected option and a summary of that options strengths and weaknesses. This screen allows the user to critically review all options thereby identifying specific strengths and weaknesses and create new options by combining strengths found in other options and eliminating identified weaknesses.

Figure 13:
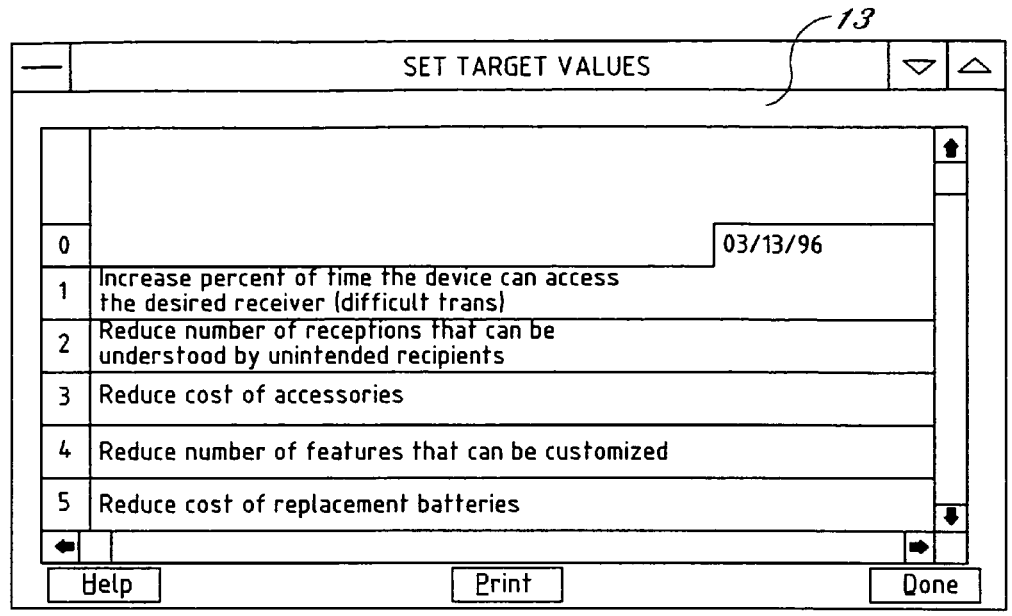
FIG. 13 depicts a screen for allowing the user to set target dates for achieving desired results.

Referring to FIG. 13, Screen 13 allows the user to define the actions necessary to implement the decision that has been recommended. For each action, the user is able to set a target date for completion.

As is now apparent, the instant invention provides a means for optimizing strategic decisions by evaluating as many factors as exists desired outcomes and predictive metric data. Use of the instant method enables customer driven decisions, and accounts for many more factors than can possibly be considered by the human mind. Use of the instant method harnesses the power of the computer to analyze these factors to provide statistically valid strategy optimization.

Additional screens (not shown) provide a means for inputting desired outcomes and predictive metrics using the database input loader portion of the computer program.

For example, an additional screen (not shown) controls the database input loader ("loader") for expanding the number and type of studies evaluated by the functional shell. This screen allows for the selection of several input fields including: studies, customer sets, desired outcomes, and predictive metrics.

Selecting the "input studies" option allows the user to input study names and corresponding categories in outline form. The categories entered form the titles of the lists on Screen 1. After all the desired studies have been defined the user selects the "done" button.

Selecting the "input customer sets" option allows the user to input data relating to new internal and external customer sets (e.g. South American End Users, South American Manufacturing, etc.) for prioritizing. After the new customer sets have been defined the user selects the "done" button.

Selecting the "input desired outcomes" option allows the user to input desired outcomes which correspond to each of the categories defined. After all the desired outcomes have been defined the user selects the "done" button.

Selecting the "input predictive metrics" option allows the user to input all of the metrics used to predict satisfaction of all of the desired outcomes previously input. In addition, a detailed description of each metric may also be entered. After all the metrics have been defined the user selects the "done" button.

The instant invention has been shown and described herein in what is considered to be the most practical and preferred embodiment. It is recognized, however, that departures may be made therefrom within the scope of the invention and that obvious modifications will occur to a person skilled in the art.

For example, an embodiment directed to optimization of "personal," as opposed to "business," strategies is contemplated wherein the user identifies and ranks desired outcomes as to those outcomes that are important to him/her personally. This embodiment may combine desired outcomes and predictive metric factors obtained through market research and through the individual user's input. Accordingly, the software may be customized by the individual user to optimize personal strategies by factoring in outcomes and metrics established and ranked by the individual as well as outcomes and metrics established by statistically valid research.

With reference to FIG. 17, a summary of the software logic and steps the user goes through is shown. These steps may be generally characterized by the reference numeral 200. First, the user accesses the software 201. The user is then asked if the user wants to access a completed study 202. If the user wants to access a completed study, the user opens an existing file 203. If not, the user selects a subject of interest and a specific mission from stored listing 204. Next, the user selects from a stored list which "customer sets" will be considered when evaluating and/or creating the solutions/strategy 205, after which, the user selects whether to order the stored desired outcomes by importance, dissatisfaction, or opportunity 206. In block 207, the user rates the importance of the relevant desired outcomes personally or selects, from a stored database, the importance ratings placed on those desired outcomes by individuals, segments, or populations previously interviewed using statistically valid, quantitative research methods 207. As shown in block 208, predictive metrics that were previously created, synergized, and stored are automatically prioritized by the software given the selected customer sets, prioritization algorithm, and importance ratings assigned to the outcomes. The user is then asked if he/she has a proposed solution (block 209). If not, the user is guided to create/document a solution (block 210). If the user has a proposed solution, then he/she documents solutions and constraints. As a next step, the user evaluates each of the documented solutions against the prioritized predictive metrics to determine how much value will be created by each solution (block 212). The percent of desired outcomes satisfied by each solution is automatically quantified. This measure of value is presented to the user as the result of the evaluation (block 213). Next, the user assesses the feasibility of the top solutions using cost, risk, effort, and other factors (block 214). If the user is satisfied with the solution, the user is presented with a formatted worksheet to prepare and document the proactive plans required for implementation and/or continuous improvement. Otherwise, the user is presented with an option to systematically improve the best solution (block 217). The user is presented with physical principles that enhance innovation (block 218). The user documents and stores the new solutions that were enhanced/created using the provided techniques (block 219). The user then repeats the steps from block 212.

What is claimed is:

1. A computer implemented method for optimizing strategic options designed to solve a selected mission, comprising the following steps:
   (a) processing data relating to subject specific desired outcomes for at least one predetermined customer set, said desired outcomes having predetermined prioritized ratings;
   (b) processing data relating to predictive metrics which predict satisfaction of said desired outcomes;
   (c) evaluating the degree to which each of said predictive metrics predict satisfaction of each of said desired outcomes for each of said customer sets;
   (d) defining strategic options, each of said defined strategic options designed to satisfy at least one of said customer desired outcomes;
   (e) comparing each of said user defined strategic options with a user defined baseline strategic option to determine which of said user defined strategic options best predict satisfaction of each of said customer desired outcomes;
   (f) prioritizing each of said desired outcomes into said predetermine prioritized ratings; and
   (g) defining a benefit of value of each of said desired outcomes, where said desired outcomes are free from any solution or specification and each of said desired outcomes remain stable over time.

2. The method of claim 1, wherein step (e) includes quantifying the degree to which each of said strategic options satisfy said customer desired outcomes by comparing the degree to which each of said defined strategic options positively or negatively incorporate said predictive metrics, said quantification means comparing each of said defined strategic options to said preselected base line option thereby yielding a strategic option which best satisfies said customer desired outcomes.

3. The method of claim 1, further comprising the following steps:
   prioritizing each of said defined strategic options into said prioritized ratings; and
   creating new strategic options to compare with previously defined strategic options.

4. The method of claim 1, further comprising the steps of:
   identifying specific strengths and weaknesses of each of said defined strategic options, and allowing the user to create new strategic options.

5. The method of claim 1, wherein said data relating to said customer desired outcomes is obtained by the following steps:
   identifying a customer set;
   interviewing a statistically representative sample of individual customers from said customer set whereby customer desired outcomes, identifying specific benefits that said customer set values, are obtained including the importance of each of said desired outcomes and the degree to which each of said desired outcomes is currently satisfied;
   quantifying said desired outcomes by ranking said desired outcomes in terms of prioritized importance such that desired outcomes identified by said customer set as important yet unsatisfied are ranked high while outcomes identified by said customer set as unimportant or satisfied are ranked low; and
   storing said desired outcomes.

6. The method of claim 1, wherein said data relating to said metrics which predict satisfaction of said customer desired outcomes is obtained by a method including the following steps:
   defining a predictive metric for each desired outcome identified by said customer set;
   establishing relationships between each of said desired outcomes and each of said predictive metrics by assigning each predictive metric a representative value depending upon the degree to which said predictive metric predicts satisfaction of each of said desired outcomes; and
   storing said predictive metrics and said assigned values.

7. The method of claim 1, further comprising the step of selecting a specific subject of interest from a plurality of subjects of interest and a specific mission from a plurality of missions related to said select subject of interest, said selected mission being selected for strategic evaluation.

8. The method of claim 1, wherein step (c) comprises ranking said predictive metrics in relation to said desired outcomes utilizing matrix analysis for determining the relationship between each of said desired outcomes and each of said predictive metrics for each selected customer set to identify those predictive metrics which predict the highest degree of desired outcome satisfaction factoring in said predetermined prioritized ratings of said desired outcomes.

9. A computer implemented method for finding an optimal solution that will satisfy strategic personal and business decisions related to a selected process, comprising the following steps:
   (a) storing data obtained from conducting interviews of a statistically representative sample of individual customers from a plurality of customer sets in connections with specific processes, said data comprising a plurality of desired outcomes from said customer sets, each of said desired outcomes having an associated importance factor and an associated satisfaction factor, said satisfaction factor indicating the degree to which a corresponding desired outcome has been achieved, said data including a plurality of predictive metrics, each of said predictive metrics having a corresponding relationship with each of said desired outcomes, said predictive metrics comprising measurable parameters which predict the satisfaction of said desired outcomes, each of said predictive metrics assigned scaled indicator for each of said desired outcomes, said scaled indicators representing the degree to which each predictive metric satisfies a corresponding particular customer desired outcome;
   (b) selecting a specific process to be evaluated for optimization in accordance with said data;
   (c) selecting a plurality of customer sets for evaluation of said selected process;
   (d) weighting the importance of said selected customer sets by assigning each of said selected customer sets a weighting value;

(e) ranking said desired outcomes associated with said selected process and said selected and weighted customer sets, whereby said desired outcome ranking is dependent upon said customer set weighted values and said importance and satisfaction factors such that desired outcomes identified as important yet unsatisfied are ranked higher than desired outcomes identified as unimportant or satisfied;

(f) prioritizing said predictive metrics in terms of the degree to which said predictive metrics predict the satisfaction of said desired outcomes associated with said selected customer sets and said selected process, whereby those predictive metrics which predict satisfaction of said ranked desired outcomes are quantified and prioritized;

(g) defining a plurality of process specific strategic options, each of said strategic options designed to satisfy said customer desired outcomes;

(h) quantifying the degree to which each of said strategic options satisfy said customer desired outcomes;

(i) prioritizing each of said desired outcomes into said predetermined prioritized ratings; and (j) defining a benefit of value for each of said desired outcomes, where said desired outcomes are free from any solution or specification and each of said desired outcomes remain stable over time.

10. A computer implemented method for evaluating and optimizing business strategies in connection with a data storage device containing data obtained from conduction interviews of statistically representative sample of individual customers from a plurality of said discrete customer sets, whereby desired outcomes, identifying benefits that each customer set values, are elicited and stored in said data storage device in discrete files corresponding to said customer sets, each of said desired outcomes having an assigned importance factor and an assigned satisfaction factor, said data storage device further including predictive metrics for each of said desired outcomes identified by each of said customer sets, said predictive metrics comprising measurable parameters for satisfying said desired outcomes, each of said predictive metrics assigned scaled indicators for each of said desired outcomes, said scaled indicators representing the degree to which a predictive metric predicts satisfaction of a particular customer desired outcome; said method comprising the following steps:

(a) selecting a plurality of customer sets for analysis;

(b) assigning weighting values to said selected customer sets thereby positively or negatively weighting the influence of each of said selected customer sets;

(c) ranking said desired outcomes in terms of importance and satisfaction whereby desired outcomes identified as important yet unsatisfied are ranked high while desired outcomes identified as unimportant or satisfied are ranked low, said ranking being dependent upon said customer set weighting;

(d) prioritizing said predictive metrics, said prioritization dependent upon said cumulative ranking of desired outcomes and dependent upon said predictive metric scaled indicators whereby the predictive metrics which predict satisfaction of high ranking desired outcomes are assigned a high priority while the predictive metrics which predict satisfaction of low ranked desired outcomes are assigned a low priority;

(e) displaying a list of said predictive metrics prioritized in terms of normalized importance relative to said ranked desired outcomes;

(f) defining a plurality of strategic options;

(g) evaluating each of said defined strategic options in terms of the degree to which each defined strategic options satisfies said desired outcomes;

(h) prioritizing each of said desired outcomes into said predetermined prioritized ratings; and (i) defining a benefit of value for each of said desired outcomes, where said desired outcomes are free from any solution or specification and each of said desired outcomes remain stable over time.

\* \* \* \* \*